United States Patent [19]

Tsujishita et al.

[11] Patent Number: 6,151,374

[45] Date of Patent: Nov. 21, 2000

[54] SYNCHRONIZING SIGNAL DETECTING APPARATUS

[75] Inventors: Masahiro Tsujishita; Kenichi Taura; Yoshiharu Ohsuga; Tadatoshi Ohkubo, all of Tokyo, Japan

[73] Assignee: Mitsubishi Denki Kabushiki Kaisha, Tokyo, Japan

[21] Appl. No.: 08/810,292

[22] Filed: Mar. 3, 1997

[30] Foreign Application Priority Data

Mar. 4, 1996 [JP] Japan ...................................... 8-046005

[51] Int. Cl.⁷ .................................. H04L 7/00; H03K 5/22
[52] U.S. Cl. ............................ 375/368; 375/340; 327/23
[58] Field of Search .................................... 375/354, 357, 375/373, 362, 360, 372, 374, 375, 368, 365, 371, 364, 363; 364/DIG. 1, DIG. 2, 259, 244, 293, 247, 247.8, 271, 942.7, 950, 189.05, 934; 371/47.1, 25.1, 27.7, 57.2; 365/233, 236; 327/107, 141, 155, 156, 159, 23; 360/72.2, 72.1, 51, 53; 331/25; 370/509, 503, 382, 514; 377/39; 386/65; 395/555, 557; 340/825.2

[56] References Cited

U.S. PATENT DOCUMENTS

5,228,025 7/1993 Le Floch et al. .......................... 370/20
5,646,966 7/1997 Chaki et al. .............................. 375/368
5,751,655 5/1998 Yamazaki et al. ....................... 365/233
5,757,854 5/1998 Hunsinger et al. ..................... 375/260

OTHER PUBLICATIONS

Federal Register/vol. 64, No. 146; pp. 41392–94, Jul. 1999.
A Digital Audio Broadcasting (DAB) Receiver, Kenichi Taura, et al, IEEE Transactions of COnsumer Electronics, vol. 42, No. 3, Aug. 1996.
"A digital audio broadcasting receiver" Mitsubishi Denki Technical Report vol. 70, No. 9, 1996. This document discloses an outline of the DAB receiver and frame format of DAB signal.

*Primary Examiner*—William Luther

[57] ABSTRACT

When an edge detecting unit detects a falling edge of a digital audio broadcasting (DAB) signal, a time instant of a timer, which has a periodic characteristic, is stored via a calculating unit into a memory. If there is one piece of data continued a number of times, when an output value of a timer becomes a value of this data offset by a frame time period, the calculating unit resets the timer. Subsequently, when the value of the timer becomes equal to the period length T, the calculating unit resets the timer and at the same time, outputs an L level to an output terminal only during a preselected time period after the timer is set to 0. Accordingly, even when another signal is mixed into a frame synchronizing signal of a DAB signal, the synchronizing signal timing is detected without increasing the time required to detect a frame header.

20 Claims, 18 Drawing Sheets

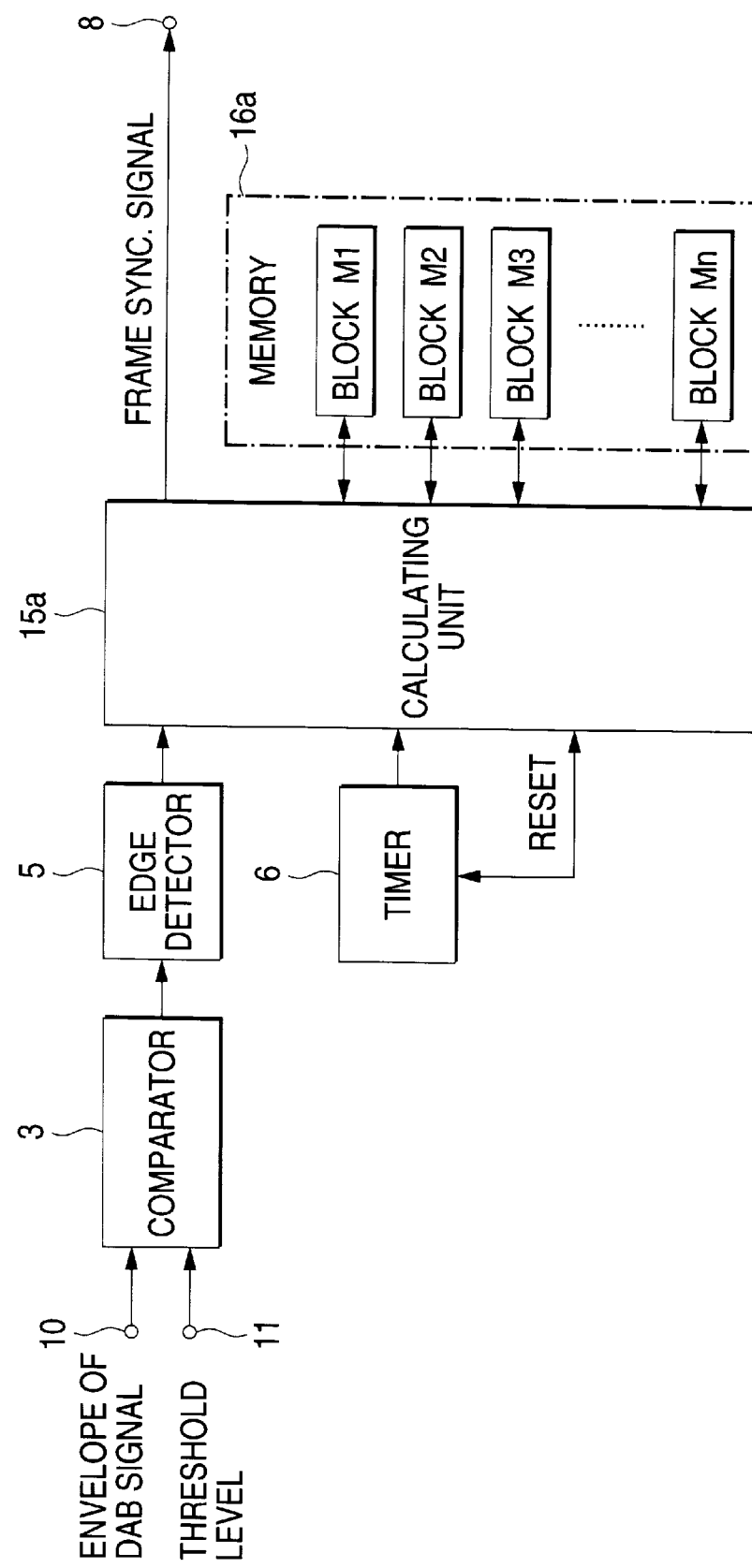

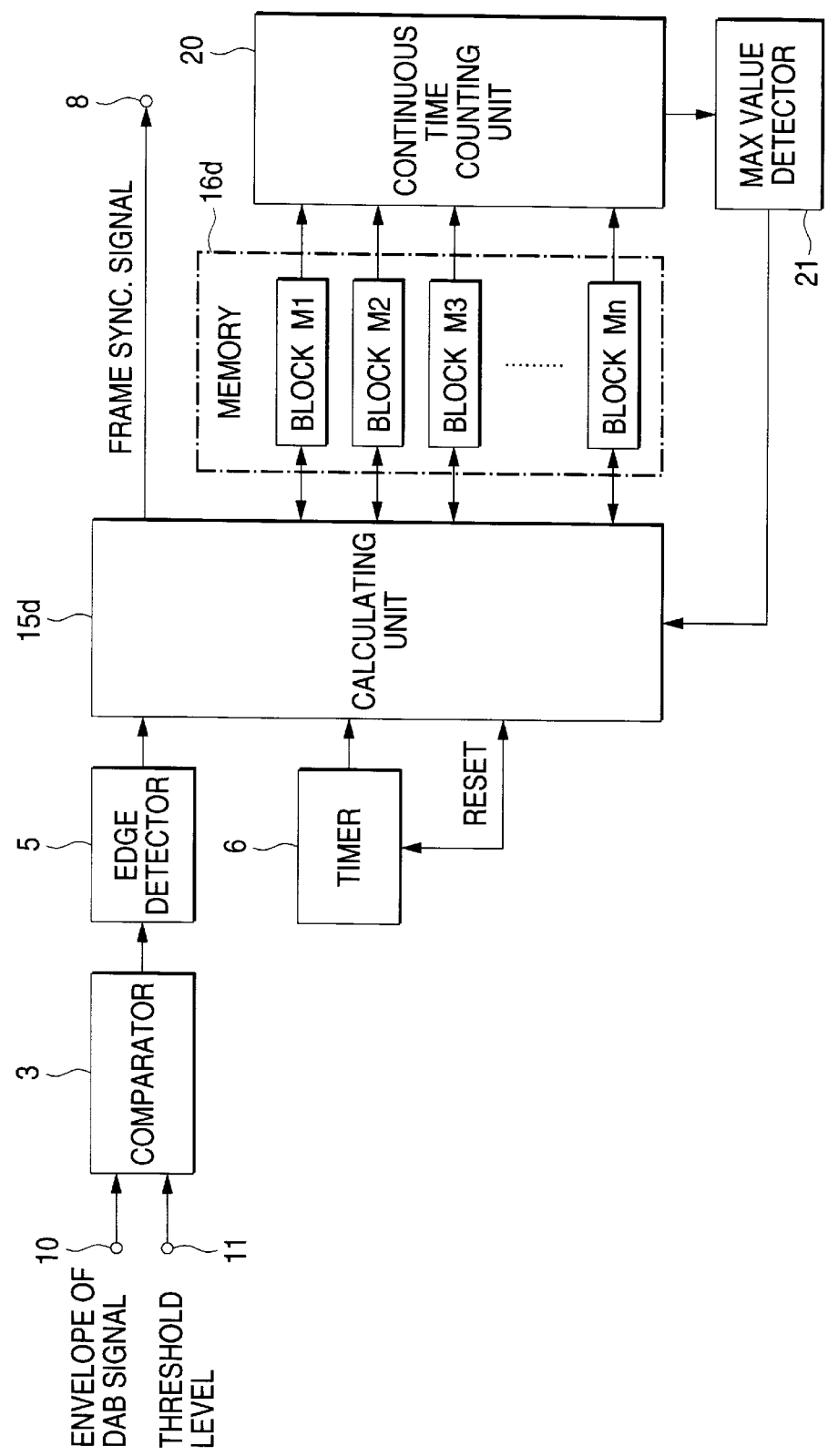

SYNCHRONIZING SIGNAL DETECTING APPARATUS

BACKGROUND OF THE INVENTION

This invention relates to a synchronizing signal detecting apparatus.

A description will now be made of a frame synchronizing signal detecting apparatus of a DAB signal (abbreviation of "Digital Audio Broadcasting" signal developed in the EUREKA 147 project).

FIG. 10 is a block diagram of the conventional synchronizing signal detecting apparatus. Reference numeral 1 is an input terminal of a DAB signal, reference numeral 2 shows an envelope detecting unit connected to the input terminal 1, reference numeral 3 denotes a comparator connected to the envelope detecting unit 2, reference numeral 4 represents a switch for switching an output signal between an S1 side of the comparator 3 and an S2 side of the ground, and reference numeral 5 shows an edge detecting unit connected to an output terminal of the switch. Reference numeral 6 is a timer, reference numeral 7 shows a control unit connected to a control terminal of the timer 6, into which the detection signal of the edge detecting unit 5, and reference numeral 8 indicates an output terminal of a frame synchronizing signal.

The received DAB signal is input into the input terminal 1. Since a NULL period during which a level of the DAB signal is 0 is provided at a head of the DAB signal frame, an output signal of the comparator 3 which has passed the envelope detecting unit 2 has a waveform (a) as shown in FIG. 11. Since a falling edge having an L level of this comparator output signal corresponds to a head of the NULL period, namely a head of a frame of the DAB signal, this falling edge is detected, so that synchronizing timing of the frame can be detected.

However, depending upon the reception conditions and the noise, the L level may be mixed in the envelope other than the NULL period and the L level of the NULL period may be dropped out. Therefore, the DAB signal is processed by the conventional synchronizing signal detecting apparatus as follows:

First, as indicated by waveform (b) in FIG. 11, the process operation is explained as executed when the L level is mixed into the comparator output signal.

Also assume that, as represented by waveform (c) of FIG. 11, the switch 4 is connected to the output S1 side of the comparator 3, and the falling edge of the comparator output signal into which the L level is first mixed is detected at a time instant "t0". Upon receipt of this detection signal, the control unit 7 resets the timer 6, and at the same time, causes the switch 4 to be connected to the ground S2 side after $\Delta T/2$. Thereafter, every time the frame period T from t0 is counted, the control unit 7 causes the switch 4 to be connected to the S1 side during only the time period of $\Delta T$, and at the same time, resets the timer 6.

Next, since the switch 4 has been switched to the S2 side even when the time instant becomes "t1", even if the comparator output signal is at the L level, the edge detecting unit 5 cannot detect the falling edge of the comparator output signal.

Next, when the time instant becomes "t0+T", although the switch 4 is connected to the S1 side only during the time period $\Delta T$, since the comparator output signal is in the H level, the edge detecting unit 5 cannot detect the falling edge of the comparator output signal.

Then, when the time instant becomes "t0+2T", although the switch 4 is connected to the S1 side only during the time period $\Delta T$, since the comparator output signal is in the H level, the edge detecting unit 5 cannot detect the falling edge of the comparator output signal.

In such a case as described above, the control unit 7 could not continuously detect the falling edge two times, and thus the control unit 7 judges that the time instant t0 is not equal to the head of the frame of the DAB signal, and thus causes the switch 4 to be connected to the S1 side.

Next, when the edge detecting unit 4 detects the falling edge at a time instant "t3", the control unit 7 resets the timer 6, and further causes the switch 4 to be connected to the S2 side after $\Delta T/2$.

Then, when the time instant of the timer 6 becomes "T", the control unit 7 causes the switch 4 to be connected to the S1 side, and at the same time, resets the timer 6. Therefore, when the time instant becomes a time instant "t4", the edge detecting unit 5 detects the falling edge. At this time, since the control unit 7 continuously detects the falling edge at the time instants t3 and t4, the control unit 7 judges that the time instant t1 corresponds to a head of a frame of the DAB signal. Thereafter, when the output from the timer 6 becomes T, after the timer 6 is reset, the control unit 7 outputs a frame synchronizing signal having an L level to the output terminal 8 only during a predetermined time period.

As explained before, the conventional synchronizing signal detecting apparatus can detect the synchronizing signal of the correct frame even if the L level is mixed into the comparator output signal of the synchronizing signal. However, when there are many mixed L levels, the conventional synchronizing signal detecting apparatus can hardly detect the head of the frame, and detection takes much time.

Next, a description will now be made of the process operation in such a case that an L level of a comparator output signal is dropped out, as shown by waveform (d) in FIG. 11.

It is now assumed that, as represented by waveform (e) of FIG. 11, the switch 4 is connected to the S1 side before $\Delta T/2$ of the time instant t1, and the falling edge is detected at the time instant t1, the control unit 7 resets the timer 6, and causes the switch 4 to be connected to the S2 side after $\Delta T$. Subsequently, every time the timer 6 counts the frame period T, the control unit 9 resets the timer 6, and repeats such an operation that the switch 4 is connected to the S1 side during the time period of $\Delta T$.

Thereafter, when the time instant becomes t2−$\Delta T/2$, the switch 4 is connected to the S1 side. However, even when the time instant becomes t2, since the falling edge is dropped, the edge detecting unit 5 cannot detect the falling edge. At this time, the control unit 7 judges that the time instant t1 is not equal to a head of a frame of the DAB signal, and this resets the timer 6.

Next, when the time instant becomes t3−$\Delta T/2$, the switch 4 is connected to the S1 side. When the time instant becomes t3, the edge detecting unit 5 detects the falling edge, and the control unit 7 resets the timer 6 and causes the switch 4 to be connected to the S2 side during the time period of $\Delta T$. When the time instant of the timer 6 becomes t4−$\Delta T/2$, the control unit 4 resets the timer 6 and causes the switch 4 to be connected to the S1 side. When the time instant becomes t4, if the edge detecting unit 5 detects the falling edge, then the control unit 7 continuously detect the falling edges two times at the time instants t3 and t4. As a result, the control unit 7 judges that the time instant t3 corresponds to a head of a frame of the DAB signal. Subsequently, every time the output of the timer 6 becomes T, the control unit 7 resets the timer 6, and thereafter outputs a frame synchronizing signal having an L level to the output terminal 8 only during a predetermined time period.

As explained before, the conventional synchronizing signal detecting apparatus can detect the synchronizing signal of the correct frame even if the L level is mixed into the comparator output signal of the synchronizing signal. However, when there are many mixed L levels, the conventional synchronizing signal detecting apparatus can hardly detect the head of the frame, and such detection takes much time.

As previously described, the conventional synchronizing signal detecting apparatus has such a problem that when the noise is mixed into the synchronizing signal and the synchronizing signal is dropped out due to the reception conditions and the noise, a lengthy time is required so as to detect the synchronizing signal.

SUMMARY OF THE INVENTION

The present invention has been made to solve the above-described problem, and therefore, has an object to provide a synchronizing signal detecting apparatus capable of outputting a synchronizing signal having a correct periodic characteristic within a short time even when noise is mixed into a synchronizing signal and a portion of a synchronizing signal is dropped out.

A synchronizing signal detecting apparatus, according to an aspect of the present invention, includes: a timer for outputting numerical value data corresponding to a time instant (which will be referred to as "time instant data" hereinafter); means for detecting timing of a synchronizing signal; means for counting times at which the detected timing signal is continued in an original period of the synchronizing signal; first storage means for storing detected time instant data of the timing; second storage means for storing time instant data where the counted continuous times are equal to a preselected time; time data coincident detecting means in which only one time instant data having the largest continuous times is detected from a plurality of time instant data stored in the second storage means, and when the one time instant data cannot be detected, the detecting operation is sequentially repeated while a second frame of the time instant data corresponding to a first preselected time of the time instant data having the plurality of continuous period is employed as a first frame of time instant data; and means for outputting the synchronizing signal when the coincident time instant data is detected, the timing of the coincident time instant data is judged as correct timing of the synchronizing signal, the synchronizing signal being outputted at the correct timing.

A synchronizing signal detecting apparatus, according to another aspect of the present invention is comprised of: a timer for outputting time instant data corresponding to a time instant; means for detecting timing of a synchronizing signal; means for counting a quantity of time instant data of each of groups, while a time difference of the detected timing signals is equal to a value obtained by multiplying an original frame period of the relevant synchronizing signal by an approximately integer, which is recognized as one group; first storage means for storing detected time instant data of the timing; second storage means for storing a representative value of the time instant data of the counted group; third storage means for storing a quantity of the time instant data of the respective groups stored in the second storage means; maximum value detecting means for detecting a maximum value of the quantity of the time instant data of the respective groups stored in the third storage means; and means for outputting the synchronizing signal when timing of a representative value of time instant data of the maximum value is judged as correct timing of the synchronizing signal, the synchronizing signal being outputted at the correct timing.

A synchronizing signal detecting apparatus, according to another aspect of the present invention, is comprised of: a timer for outputting time instant data corresponding to a time instant; detecting means for detecting timing of a synchronizing signal and for outputting data "1" when the synchronizing signal is detected; address detecting means for making the time instant data when the timing of the synchronizing signal is detected in correspondence with an address; a plurality of storage means for storing the data "1" at an address calculated by the address determining means only during a preselected one time period; an adder for adding a quantity of the data "1" stored in the plural storage means to each other every address; maximum value detecting means for detecting a maximum value of these added values; and means for correcting the timing of the synchronizing signal to be outputted by judging the time instant data corresponding to an address where the maximum value is stored as a difference from correct timing of the synchronizing signal.

A synchronizing signal detecting apparatus, according to a further aspect of the present invention, is comprised of: a timer for outputting time instant data corresponding to a time instant; detecting means for detecting timing of a synchronizing signal and for outputting data "1" when the synchronizing signal is detected; address detecting means for making the time instant data when the timing of the synchronizing signal is detected in correspondence with an address; a plurality of storage means for storing the data "1" at an address calculated by the address determining means only during a preselected one time period; continuous time counting means for detecting continuous times of the data "1" stored at the respective addresses of these storage means; a maximum value detector for calculating a maximum value of the continuous times of the data "1" at the respective addresses; and means for correcting the timing of the synchronizing signal to be outputted by judging the time instant data corresponding to an address where the maximum value is stored as a difference from correct timing of the synchronizing signal.

In the synchronizing signal detecting apparatus according to the embodiment of the present invention, the timing detection process of the frame period of the DAB signal is carried out every frame period T of the DAB signal. In the first 1 time period, the time instant data of the timer when the edge detecting unit detects the signal indicative of the head of the frame is stored in the first storage means. In the second time period of the frame of the DAB signal, at the time instant when the signal indicative of the head of the frame is detected, a search is made of such time instant data separated by a time period of approximately "T" from the instant data stored in the first memory, and then this value is stored as one-time-coincidence time data into the second storage means. In the third time period of the frame of the DAB signal, at the time instant when the signal indicative of the head of the frame is detected, a search is made of such time instant data separated by a time period of approximately "T" from the instant data stored in the second memory, and then this value is stored as two-time-coincidence time data into the third storage means. Subsequently, the process operations executed in the above-described second period and third period are repeated. When there is one data having a continuous and periodic characteristic, or the data are continued N times equal to the frame period multiplied by an integer, this time instant data is read from the third storage means, and this time data is used as the output timing of the synchronizing signal.

The time data group having the periodic characteristic is detected as follows. In the frame period of the DAB signal, time data that the time difference between the output data of the timer stored in the first storage means becomes a value obtained by multiplying the frame period T of the DAB signal by a value of an approximately integer is handled as one group. The representative value of this group is stored in the second storage means. Also, the number of data of the same group is counted to be stored in the third storage means. The maximum value of the counted values of the third storage means is detected by the maximum value detecting means, and the time instant corresponding to the address of this maximum value is read from the second storage means, and this read time instant data is used as the output timing of the synchronizing signal.

The time data group having the periodic characteristic is detected as follows. The fourth storage means is employed which is arranged by a plurality of memory blocks corresponding to the time data. When the output value of the timer becomes the time period T, the timer is again set to "0", and the address determining means sets the address in such a manner that the time instant data of the timer is stored into the next memory block of the fourth storage means. The frame period of the set DAB signal is detected in the calculating unit, the data of the addresses corresponding to the same time instants of the respective memory blocks of the fourth storage means are added in the adder. Then, the maximum value is detected by the maximum value detecting means, and the output timing of the synchronizing signal is corrected by the time instant data corresponding to the address of this maximum value.

The time data group having the periodic characteristic is detected as follows. The fifth storage means is employed which is arranged by a plurality of memory blocks corresponding to the addresses. When the output value of the timer becomes the time period T, the timer is again set to "0", and the address determining means sets the address in such a manner that the time instant data of the timer is stored into the next memory block. The frame period of the set DAB signal is detected in the calculating unit, the maximum value among the numbers when the data "1" of the address corresponding to the same time instants of the respective memory blocks are continued is detected by the continuous time count means, and the output timing of the synchronizing signal is corrected by the time instant data corresponding to the address of this maximum value.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 1 is a block diagram for representing a synchronizing signal detecting apparatus according to first embodiment of the present invention;

FIG. 8 is a block diagram for showing a synchronizing signal detecting apparatus according to fourth embodiment of the present invention;

DETAILED DESCRIPTION OF THE PREFERRED EMBODIMENTS

Figure 2A:
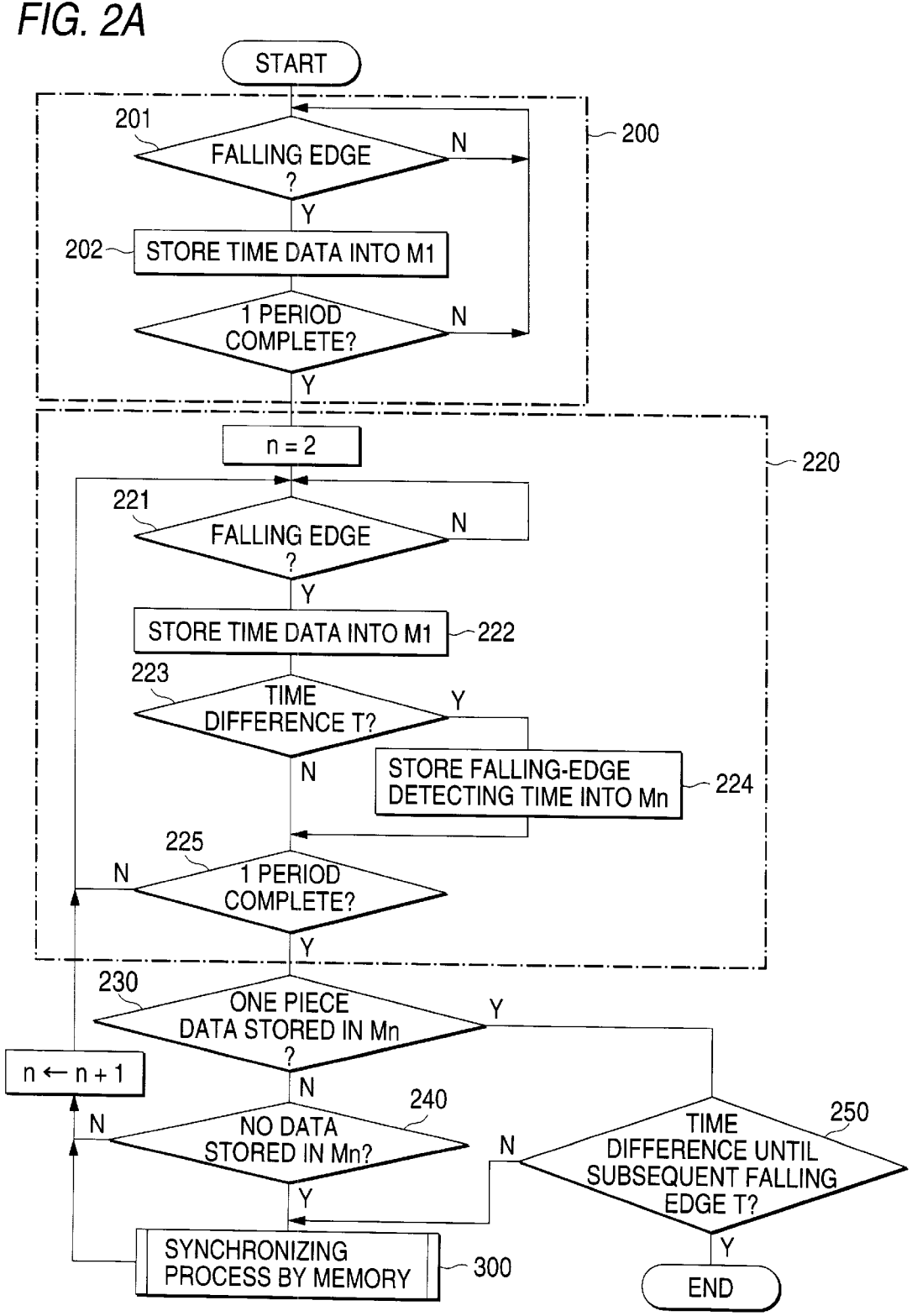
FIGS. 2A and 2B are flow charts of the first embodiment.

Referring now to drawings, various embodiments of the present invention will be described in detail.

First Embodiment

FIG. 1 is a block diagram for representing a synchronizing signal detecting apparatus according to first embodiment of the present invention.

Reference numeral 10 shows an input signal of an envelope of a DAB signal; reference numeral 11 is an input terminal of a threshold level; reference numeral 3 shows a comparator; and reference numeral 5 denotes an edge detecting unit for detecting a falling edge of a comparator output signal. Reference numeral 6 shows a timer for outputting time instant data corresponding to time instants; reference numeral 15a denotes a calculating unit for calculating periodic characteristics of output signals derived from the edge detecting unit 5 and the timer 6; reference numeral 16a indicates a memory connected to the calculating unit 15a including M1 to Mn memory blocks; and reference numeral 8 is an output terminal of a frame synchronizing signal.

Next, the operation of the embodiment illustrated in FIG. 1 will be described.

Figure 11:
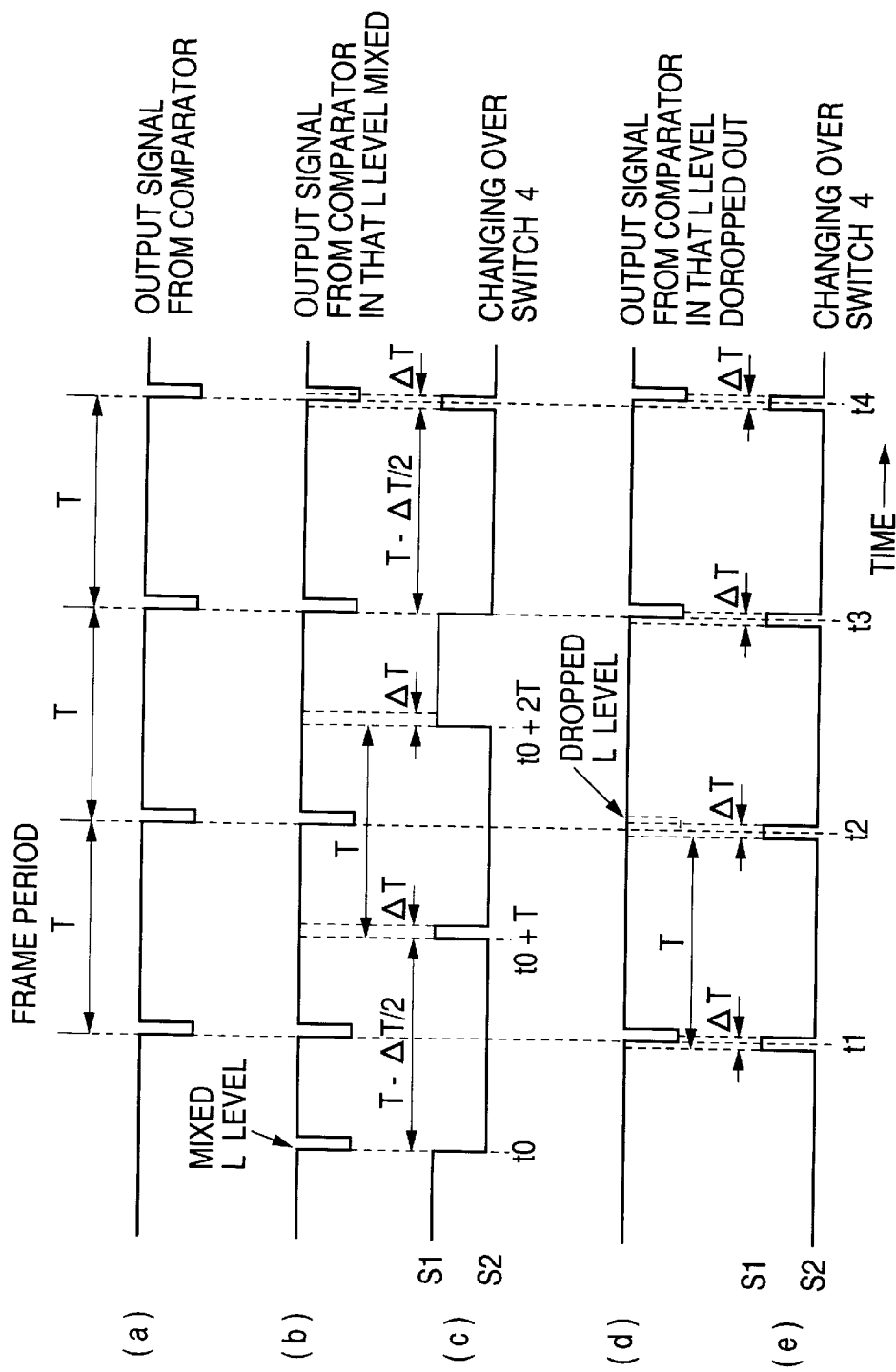
FIG. 11 is a waveform diagram of the synchronizing signal of the conventional apparatus.

An envelope of a DAB signal input into the input terminal 10 shown in FIG. 1 is waveform-shaped by the comparator 3, and then a comparator output signal having a falling edge with a frame period "T" shown in FIG. 11(a) is outputted to the edge detecting unit 5. The edge detecting unit 5 detects the falling edge to use this timing as a subject of frame synchronization timing. It is possible that falling timing which is irrelevant to a head of the DAB signal is mixed into the falling edge detected by this edge detecting unit 5, depending upon the noise and the reception conditions.

The calculating unit 15a executes a process operation defined in a flow chart shown in FIG. 2A. First, the time instant data outputted by the timer 6 and the timing signal produced when the edge detecting unit 5 detects the falling edge are entered into the calculating unit 15a.

In this embodiment, it is now assumed that an original time period of a frame of a DAB signal is "T".

The process operation is executed every 1 time period.

In a flow chart of FIG. 2A, a process step 200 corresponds to a process operation for a first time period, at which the edge detecting unit 5 detects the falling edge (step 201), and the time instant data of the timer 6 obtained at this time is stored into the block M1 of the memory 16a (step 202).

A process step 220 indicates a process operation executed in a second time period and the subsequent time periods. The edge detecting unit 5 detects the falling edge (step 221), and the time instant data of the timer 6 obtained at this time is stored into the block M1 of the memory 16a (step 222). At this time, the calculating unit 15a compares the falling-edge-detection time instant with the time instant data stored in the memory block M1 (step 223). When the data whose time difference is substantially equal to "T" is present in the block M1, this falling-edge-detection time instant is stored into the memory block M2 (step 224).

When the time period T in the second time period has elapsed (step 225), the process operation is returned to the step 220 at which the process operation for a third time period is entered. In the process operation for the third time period, the edge detecting unit 5 detects the falling edge (step 221), and the time instant data of the timer 6 obtained at this time is stored into the block M1 of the memory 16a (step 222). At this time, the calculating unit 15a compares the falling-edge-detection time instant with the time instant data stored in the memory block M2 (step 223). When the data whose time difference is substantially equal to "T" is present in the block M2, this falling-edge-detection time instant is stored into the memory block M3 (step 224).

The above-described process operation is repeated until the number of data stored in the last memory block becomes 1 (one). In other words, when a time period "T" of an (n−1)th time period has passed, the process operation is returned to the step 220, at which the process operation for an n-th time period is entered. In the process operation for the n-th time period, the edge detecting unit 5 detects the falling edge (step 221), and the time instant data of the timer 6 obtained at this time is stored into the block M1 of the memory 16a (step 222). At this time, the calculating unit 15a compares the falling-edge-detection time instant with the time instant data stored in the memory block M(n−1) (step 223). When the data whose time difference is substantially equal to "T" is present in the block M(n−1), this falling-edge-detection time instant is stored into the memory block Mn (step 224).

In the case that there is one piece of data stored in the last memory block Mn when the process operation for the n-th time period is accomplished (step 230), a judgment is made as to whether or not the time until the subsequent falling edge is detected is equal to "T" (step 250). If this time difference is equal to "T", then the calculating unit 15a may judge that the head timing of the frame could be detected, and the process operation defined in the flow chart of FIG. 2A ends. Specifically, in the case that the quantity of data stored in the last memory block Mn becomes 1 when the process operation for the n-th time period is accomplished, the process operation defined at the step 220 is repeated for a further 1 turn. Then, it is possible to judge the detection of the head timing of the frame by judging whether or not the quantity of data stored in the memory block M(n+1) is equal to 1.

On the other hand, when the process operation for the n-th time period ends, if no data is stored in the last memory block Mn (step 240), or the time difference until the next falling edge is not equal to "T" (step 250), then this implies that the falling edge of the head of the correct frame is not contained in the first time period. In this case, it indicates that the head timing of the frame cannot be detected.

Figure 12A:
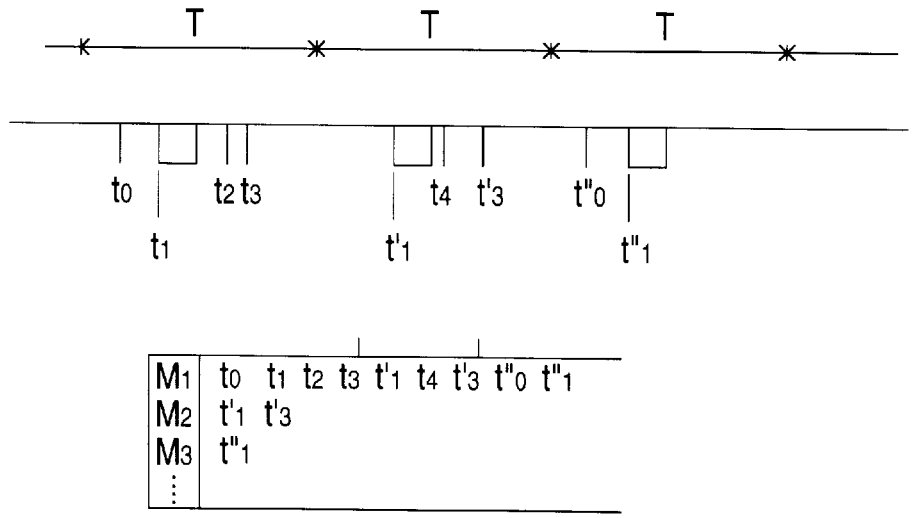
FIGS. 12A and 12B are explanatory diagrams of the first embodiment.

Referring now to FIG. 12A, the above-described process operation will be described. It should be noted in this drawing that an original time period of a frame of the DAB signal is "T"; symbols $t_1$, $t_1'$, $t_1''$ represent falling timing of a NULL time period indicative of heads of the respective frames; and other symbols $t_0$, $t_2$, $t_3$, . . . , denote mixed L-level signals. Also, a signal group having the same number such as $t_3$ and $t_3''$ represents a signal having a periodical characteristic of a time period T.

In the process operation for a first time period, all of time instants $t_0$, $t_1$, $t_2$, $t_3$ when falling pulses are detected are stored in the memory block M1.

In the process operation for a second time period, when a time instant $t_1'$ is detected, this detected time instant $t_1'$ is stored in the memory block M1, and also this detected time instant $t_1'$ is compared with the time instant data stored in the memory block M1 to judge as to whether or not such data whose time difference is substantially equal to T is present in the memory block M1. Since $t_1$ whose time difference is substantially equal to T has been stored in the block M1, the detected time instant $t_1'$ is stored in the memory block M2.

Next, when a time instant $t_4$ is detected, this detected time instant $t_4$ is stored in the memory block M1, and also this detected time instant $t_4$ is compared with the time instant data stored in the memory block M1 to judge whether or not such data whose time difference is substantially equal to T is present in the memory block M1. Since no time instant data whose time difference is substantially equal to T has been stored in the block M1, the detected time instant $t_4$ is not stored into the memory block M2.

Subsequently, the process operation is advanced in a similar manner. When the second time period ends, the time instant data $t_1'$, $t_4$, $t_3'$ are stored in the memory block M1 into which the time instant data $t_0$, $t_1$, $t_2$, $t_3$ have been stored, whereas the time instant data $t_1'$, $t_3'$ are stored in the memory block M2.

In the process operation for a third time period, when a time instant $t_0''$ is detected, this detected time instant $t_0''$ is stored in the memory block M1, and also this detected time instant $t_0''$ is compared with the time instant data stored in the memory block M2 to judge whether or not such data whose time difference is substantially equal to T is present in the memory block M2. Since no time instant data whose time difference is substantially equal to T has been stored in the block M2, the detected time instant $t_0''$ is not stored into the memory block M3.

Next, when a time instant $t_1''$ is detected, this detected time instant $t_1''$ is stored in the memory block M1, and also this detected time instant $t_1''$ is compared with the time instant data stored in the memory block M2 to judge as whether or not such data whose time difference is substantially equal to T is present in the memory block M2. Since $t_1'$ whose time difference is substantially equal to T has been stored in the block M2, the detected time instant $t_1''$ is stored in the memory block M3.

When the third time period is accomplished, the time instant data $t_0''$ and $t_1''$ are stored in the memory block M1 into which the time instant data $t_0$, $t_1$, $t_2$, $t_3$, $t_1'$, $t_4$, $t_3'$ have been stored, whereas the time instant data $t_1''$ is stored into the memory block M3.

When the process operation for the third time period ends, since the number of data stored in the last memory block M3 becomes 1, the calculating unit 15a may judge that the head timing of the frame could be detected after making such a confirmation that the falling edge is detected after "T" equal to the time period of the frame. Then, the process operation is accomplished. In other words, in the example of FIG. 12A, the calculating unit judges that the time instants $t_1$, $t_1'$, $t_1''$ correspond to the heads of the frames of the DAB signal. Subsequently, when the output from the timer 6 becomes T, the timer 6 is reset, and an L-leveled frame synchronizing signal having a constant time period is outputted to the output terminal 8.

As previously described, when the process operation for the n-th time period ends, if no data is stored in the last memory block Mn, or the time difference until the next falling edge is not equal to "T", then this implies that the falling edge of the head of the correct frame is not contained in the first time period. In this case, it indicates that the head timing of the frame cannot be detected.

Figure 12B:
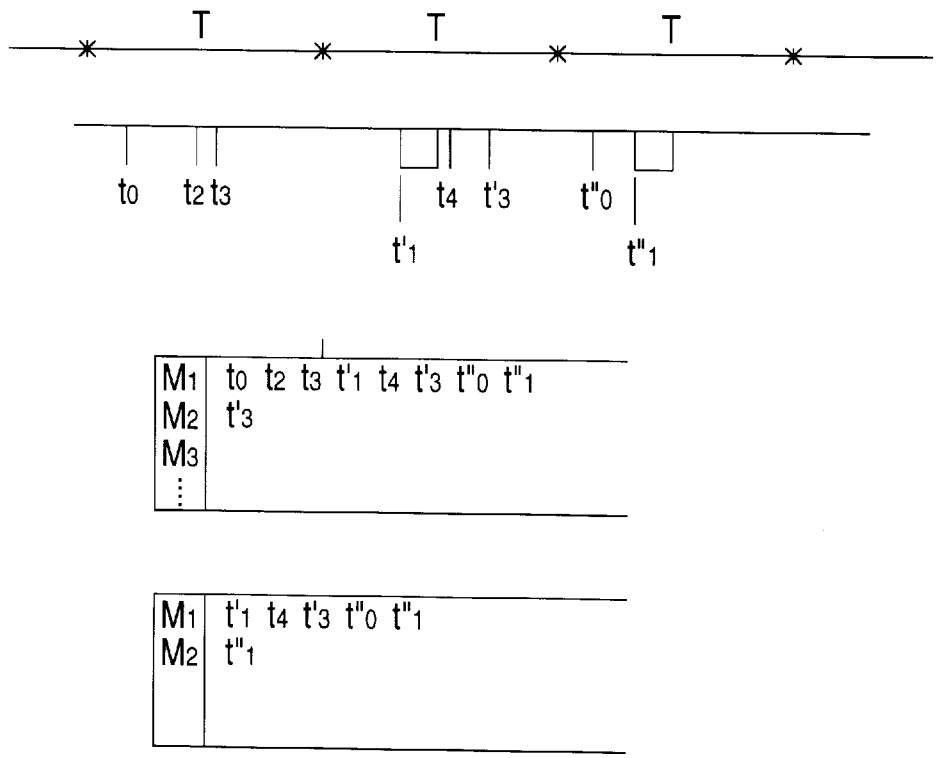

This case will now be explained with reference to FIG. 12B.

In the process operation for a first time period, all of time periods $t_0$, $t_2$, $t_3$ when falling pulses are detected are stored in the memory block M1.

In the process operation for a second time period, when the falling edge is detected at the time instant $t_1'$, this detected time instant $t_1'$ is stored in the memory block M1, and also this detected time instant $t_1'$ is compared with the time instant data stored in the memory block M1 as to judge whether or not such data whose time difference is substantially equal to T is present in the memory block M1. Since no time instant data whose time difference becomes approximately T is not stored in the memory block M1, this detected time instant $t_1'$ is not stored into the memory block M2.

When the falling edge is detected at the time instant $t_3'$, this detected time instant $t_3'$ is stored in the memory block M1, and also this detected time instant $t_3'$ is compared with the time instant data stored in the memory block M1 so as to judge as to whether or not such data whose time difference is substantially equal to T is present in the memory block M1. Since such time instant data $t_3$ whose time difference becomes approximately T is stored in the memory block M1, this detected time instant $t_3'$ is stored into the memory block M2.

When the second time period is accomplished, the time instant data $t_1'$, $t_4$, $t_3'$ are stored into the memory block M1 into which the time instant data $t_0$, $t_2$, $t_3$, have been stored, whereas the time instant data $t_3'$ is stored into the memory block M2.

Since the falling edge having the time difference T from the time instant $t_3'$ stored in the memory block M2 is not detected in the third time period, it is judged that this time instant $t_3'$ is not equal to the head timing of the frame.

Figure 3A:
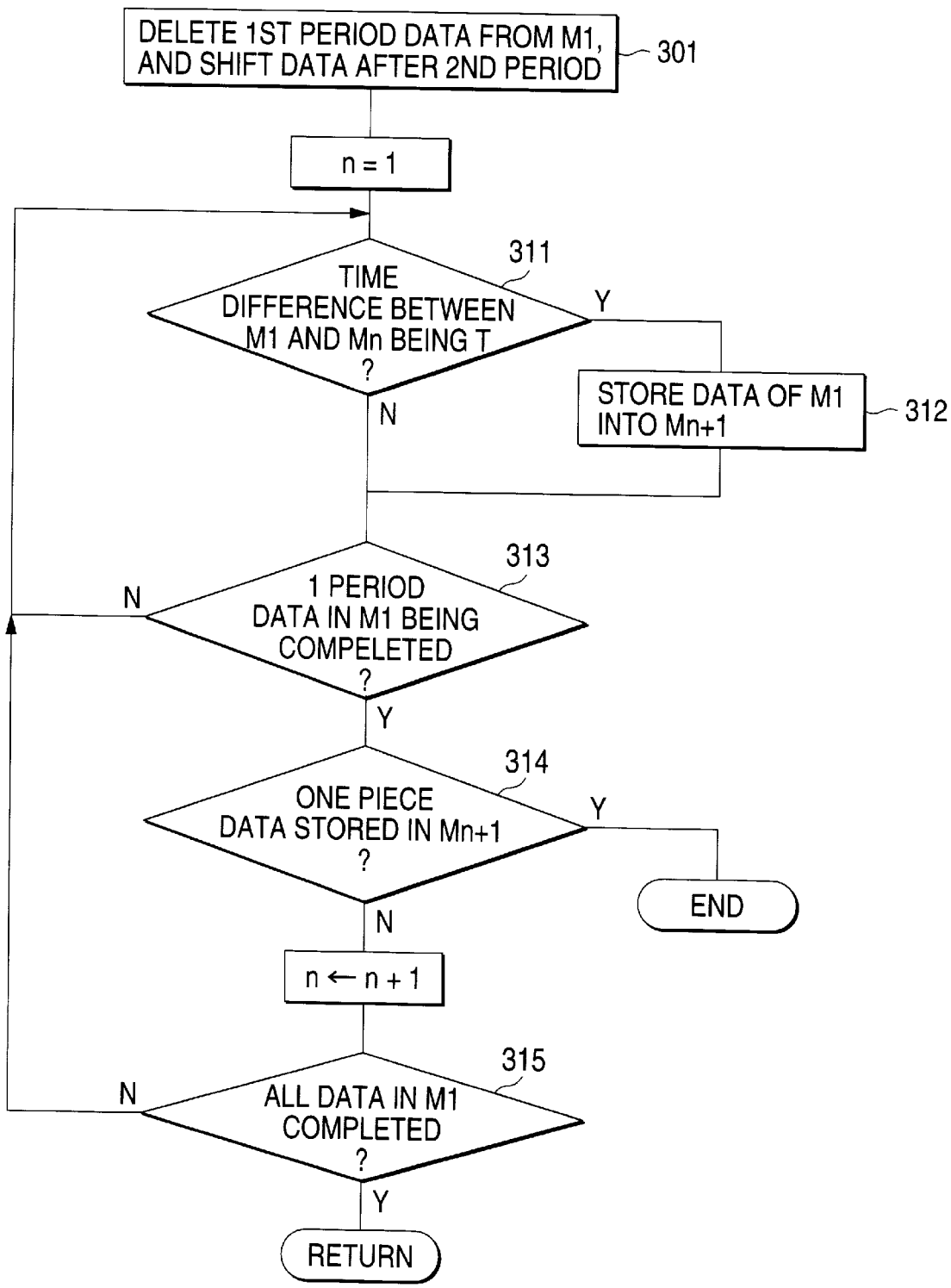
FIGS. 3A and 3B are flow charts of the first embodiment.

As the solving measure, a synchronization process operation (step 300) by the memory is carried out. In FIG. 3A, there is shown a flow chart for describing this synchronization process operation. This synchronization process operation is directed to obtain a periodic characteristic by employing the time instant data for the second time period as the time instant data for the first time period among the time data of the falling edges stored in the memory block M1. That is, the time instant data stored in the first time period is deleted from the time instant data stored in the memory block M1, and the time instant data stored after the second time period are shifted (step 301).

In the subsequent process operation of a step 310, time instant data corresponding to that for the third time period among the shifted time instant data stored in the memory block M1 is compared with the time instant data corresponding to that for the second time period in order to seek time instant data whose time difference becomes T (step 311). When there is such data whose time difference becomes T, this data is stored in the memory block M2 (step 312). Subsequently, this process operation is repeated in a similar manner to the above case until the number of data stored in the last memory block becomes 1.

In the above-described process operation executed in the process step 310, the periodic characteristic is obtained by employing the data of the block M1 of the memory 16a instead of the timer 6.

If the number of data stored in the last memory block M(n+1) becomes 1 and then the periodic characteristic of the time period T can be found from the data stored in the memory block M1 during the above-explained process operation, then the timing thereof is used as a head of a frame.

If the periodic characteristic could not be found, then the process operation is returned to that of the flow chart of FIG. 2A. Also, in this case, since the periodic characteristic has been calculated in a half way from the time instant data stored in the memory block M1 of the memory 16a, the time instant data need not be obtained from the first data, so that the processing time can be shortened.

A specific example of the above case will now be explained with reference to FIG. 12B. When the synchronization process operation by the memory is commenced (step 300), the time instant data $t_0$, $t_2$, $t_3$, $t_1'$, $t_4$, $t_3'$, $t_0''$, $t_1''$ have been stored in the memory block M1. The time instant data $t_0$, $t_2$, $t_3$ stored during the first time period are deleted, and the time instant data subsequent to the time instant data $t_1'$ are shifted. As a result, the time instant data $t_1'$, $t_4$, $t_3'$, $t_0''$, $t_1''$ are stored in the memory block.

Next, the time instant data $t_0''$ stored in the third time period is compared with the time instant data $t_1'$, $t_4$, $t_3'$ stored in the second time period. Since such time instant data is not stored in the memory block M1, whose time difference from this time instant data $t_0$ becomes T, this time instant data is not stored in the memory block M2. Similarly, the time instant data $t_1''$ stored in the third time period is compared with the time instant data stored in the second time period. Since there is such time instant data $t_1'$ whose time difference becomes substantially T, the time instant data $t_1''$ is stored in the memory block M2.

When a time instant defined by adding the time period "T" to the time instant data ($t_1''$) is detected among the time instant data of the head timing of the frame which is detected during the above-described process operation, the timer 6 is reset and also the output terminal 8 is set to an L level during a predetermined time period and thereafter set to an H level.

In the above-described process operation, the process operation continues until the timing having the periodic characteristic becomes 1. Alternatively, times of time periods to be processed are set, and when it reaches the firstly set coincident time, the timer 6 is set to 0. Subsequently, when the output of the timer 6 becomes T, the calculating unit 15a may again set the timer 6 to 0, and may bring the level of the output terminal 8 to an L level for a predetermined time period, and thereafter may bring the L level to an H level.

Also, the comparator 3, the edge detecting unit 5, and the timer 6 may be realized by a digital signal process by utilizing of a microcomputer and a DSP.

Figure 2B:
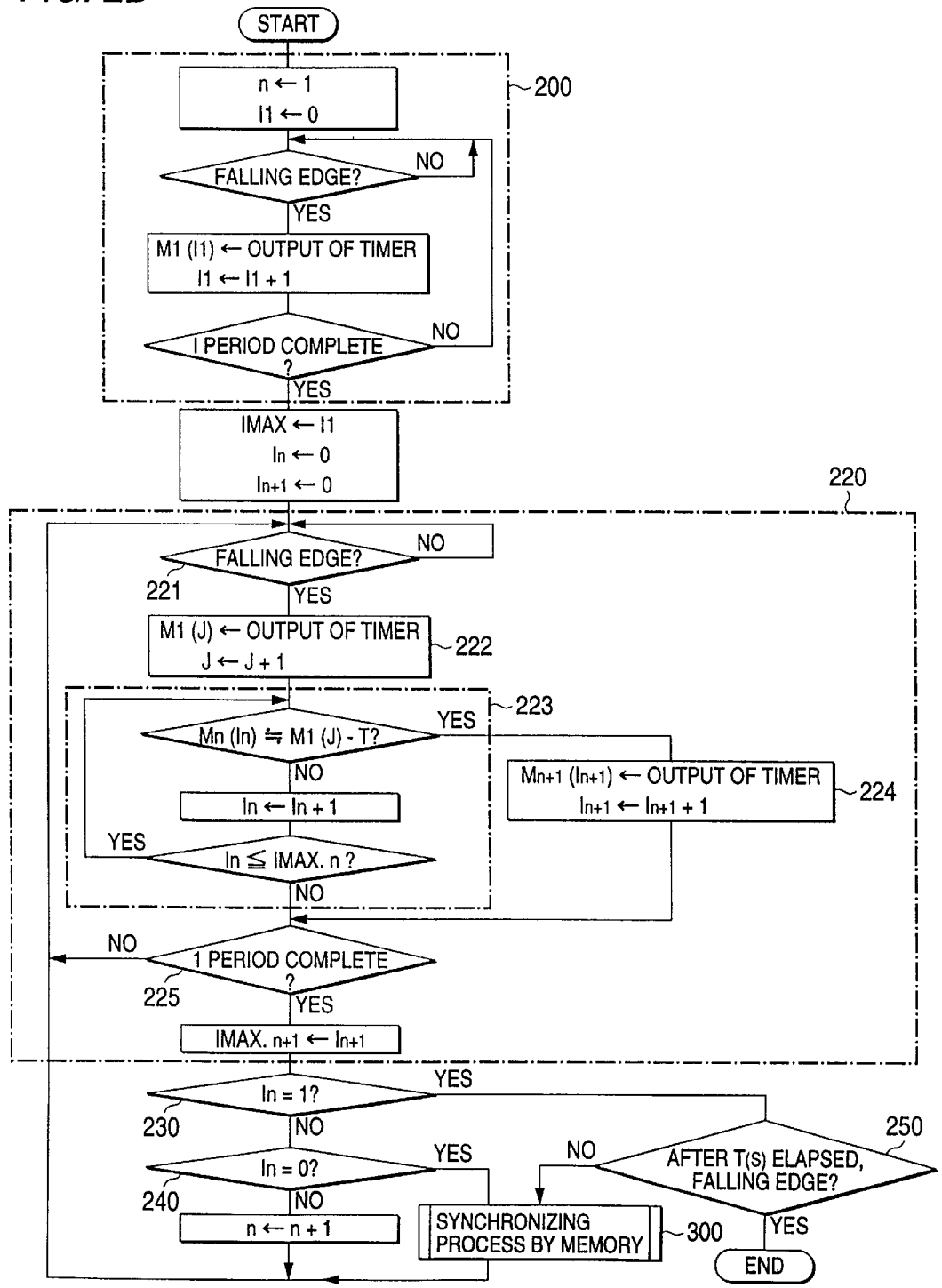
Figure 3B:
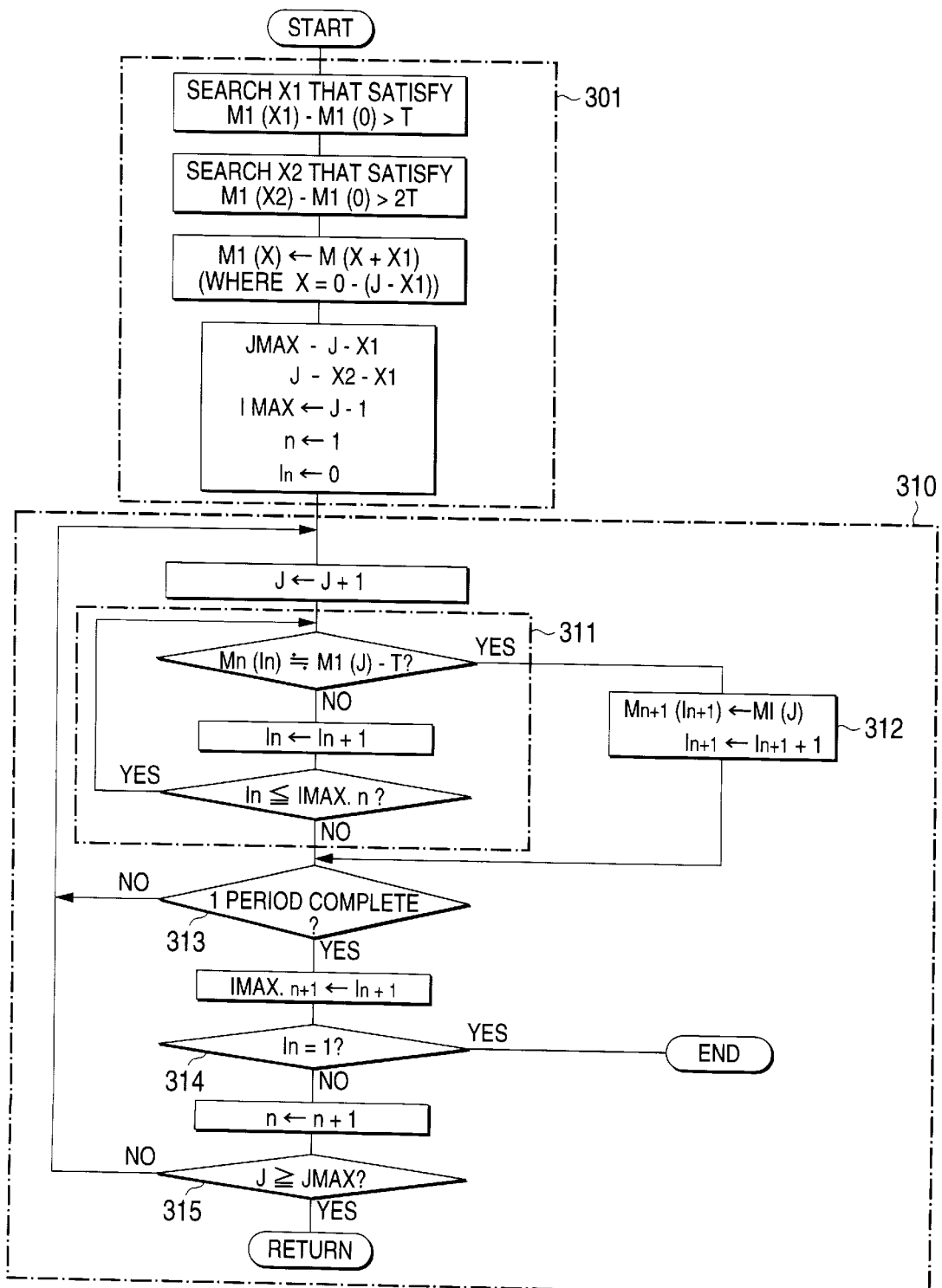

FIG. 2B and FIG. 3B show flow charts for describing the above-described first embodiment of the present invention as a specific example. In the drawings, symbol "n" indicates the number of the memory block; symbol "Mn" denotes an n-th memory block; symbol "In" represents an address of the memory block Mn; symbol "$I_{MAX}$" is the data number of M1; symbol "$I_{MAX}$n" is the data number of Mn; symbol "J" shows an address of the memory block M1; symbol "X1" is a last address of the time data for the first time period stored in the memory block M1; symbol "X2" is a last address of the time instant data for the second time period stored in the memory block M1; and symbol "$J_{MAX}$" shows a last address of the memory block M1 after being shifted.

Second Embodiment

Figure 4:
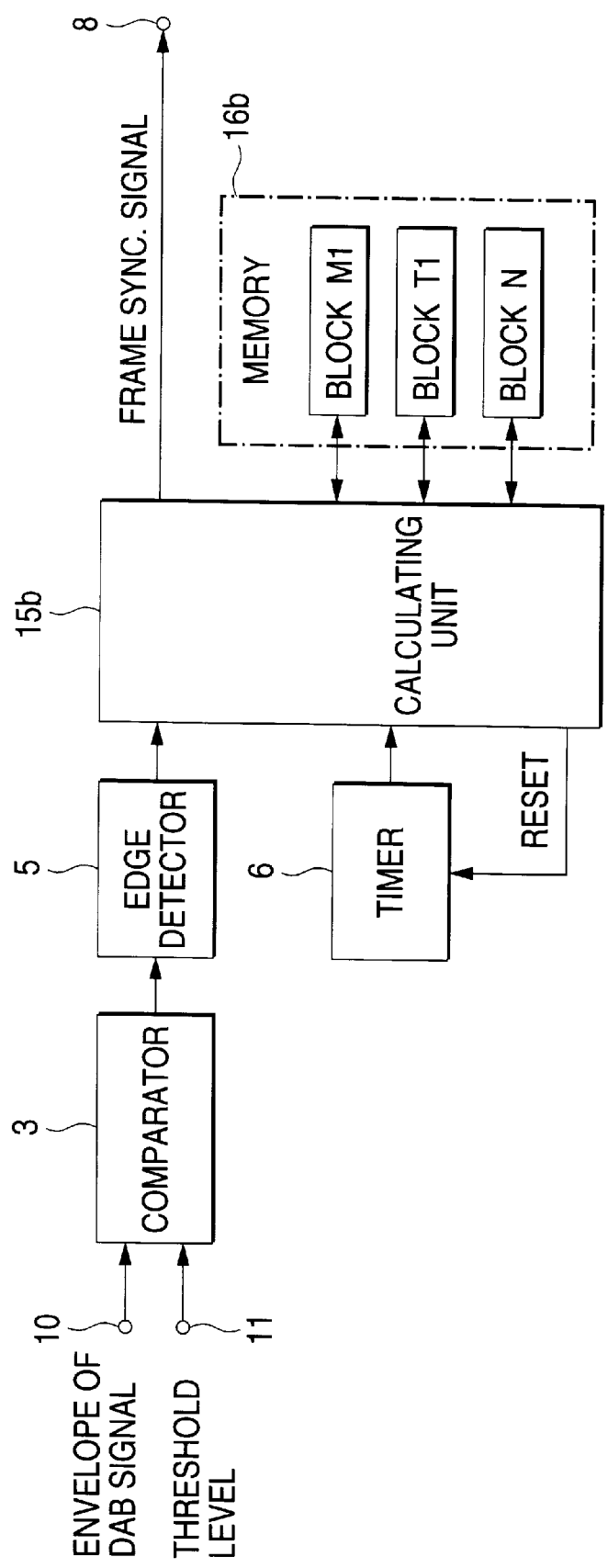
FIG. 4 is a block diagram for showing a synchronizing signal detecting apparatus according to second embodiment of the present invention.

FIG. 4 is a block diagram for indicating a synchronizing signal detection apparatus according to a second embodiment of the present invention. It should be noted that the same reference numerals of FIG. 1 are employed as those for denoting the same or similar circuit elements in this embodiment. In this drawing, reference numeral 15b indicates a calculating unit for calculating a periodic characteristic of a signal from the outputs of the edge detecting unit 5 and the timer 6. Reference numeral 16b denotes a memory connected to the calculating unit 15b. Symbols M1, TI, N represent memory blocks. The memory block M1 stores time instant data of the timer 6 at detecting of a falling edge for n time periods. The memory block TI stores a time instant when a falling edge appears. The memory block N stores the number of detecting a falling edge corresponding to the time instant data of the memory block TI.

Operation of the second embodiment will now be described.

The edge detecting unit 5 detects a falling edge of an output signal from the comparator, and provisionally determines arbitrary one timing among the detected falling edges as a head of a frame of a DAB signal. Then, the time counting operation by the timer is commenced. It should be understood that the falling edges irrelevant to the head of the DAB signal are mixed with the falling edge detected by the edge detecting unit 5.

Figure 5A:
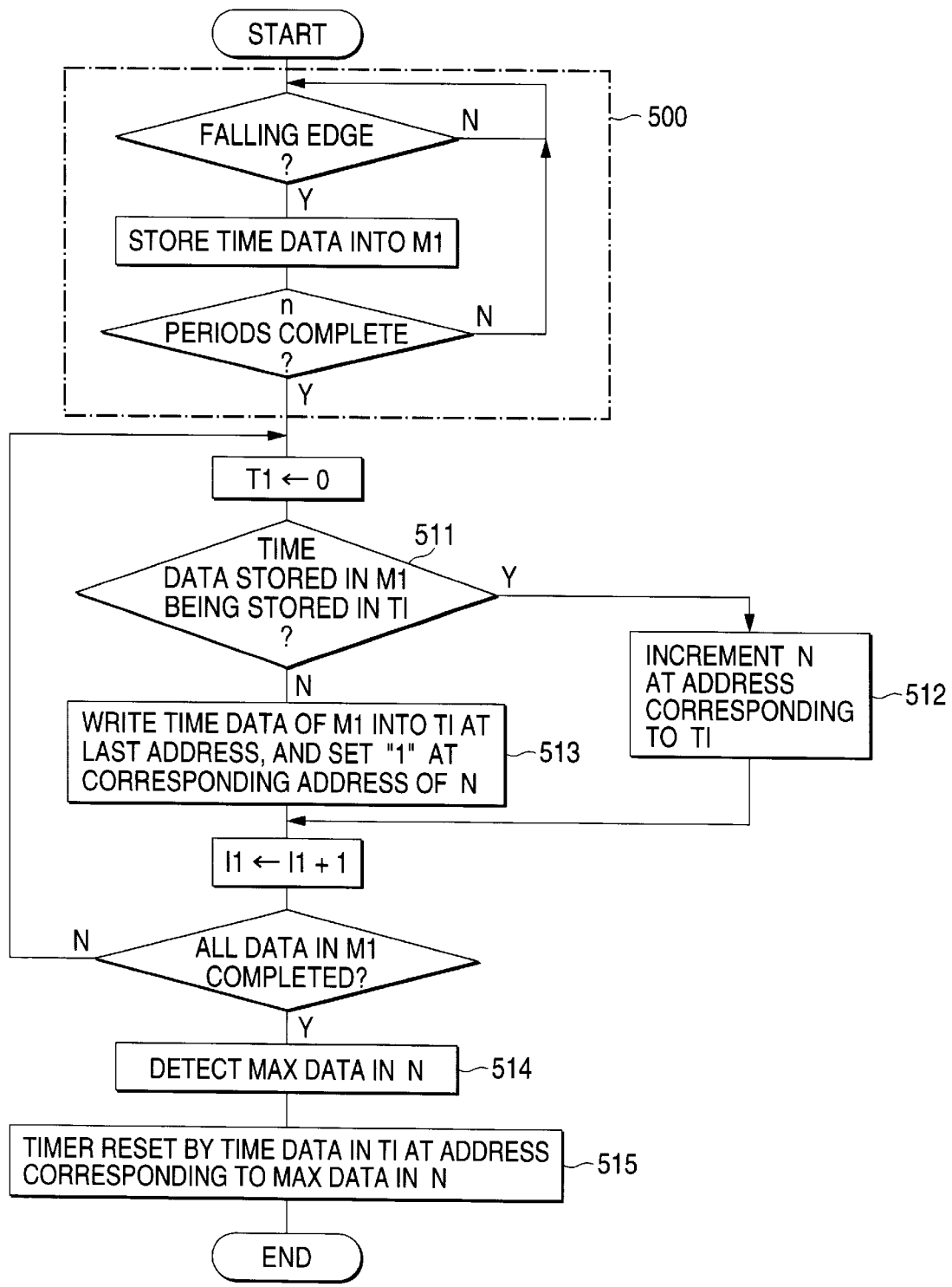
FIGS. 5A and 5B are flow charts of the second embodiment.

The calculating unit 15b detects the head timing of the frame in accordance with a flow chart of FIG. 5A. First, the time instant data output from the timer 6 and the timing signal of the falling edge detected by the edge detecting unit are entered into the calculating unit 15b.

Next, in a process step 500, the calculating unit 15b causes the time instant data of the timer 6 when the falling edge is detected to be stored into the block M1 of the memory 16b only during such a time period of the frame period T×n. At this time, when the output of the timer 6 indicates T, the timer 6 is reset.

Next, the calculating unit 15b checks all of the data stored in the memory block M1 to determine whether or not an approximate value is stored in the memory block TI (step 511). If the approximate value is stored in the memory block TI, then 1 is added to the corresponding address of the memory block N corresponding to the address of this memory block TI (step 512). When the approximate value is not present in the memory block TI, the time instant data of the memory block M1 is written into the memory block TI at an address subsequent to a last address for the data stored in the memory block TI, and data at an address of the memory block N corresponding to this address is set to "1" (step 513).

After the above-described process operation has been carried out for all of the data stored in the memory block M1, the calculating unit 15b detects a maximum value of the data stored in the memory block N of the memory 16b (step 514). The time data stored at an address of the memory block TI corresponding to an address of this maximum value of the memory block is such time shifted between the output of the timer 6 and the head timing of the DAB signal. As a result, if the time of the timer 6 is shifted by the time of this time instant data, then when the output from the timer 6 becomes 0, it will constitute the head timing of the frame.

Subsequently, when the output value of the timer 6 becomes T, the calculating unit 15b resets the output value of the timer 6 to 0, and causes the output terminal 8 to be set to an L level for a predetermined time and thereafter to be set to an H level.

Figure 13:
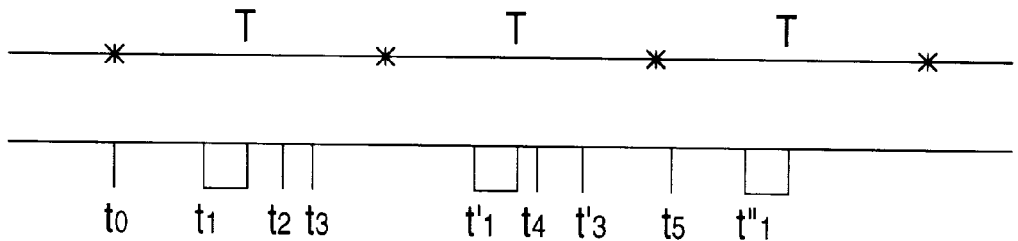
FIG. 13 is explanatory diagrams of the second embodiment.

A specific example of the above-described second embodiment will now be described with reference to FIG. 13.

First, when a falling edge is detected at a time instant $t_0$, the time counting operation by the timer 6 is commenced. The calculating unit 15b sequentially stores the time instant data $t_1, t_2, t_3, t_1', t_4 \ldots$) when the falling edge is detected into the memory block M1 of the memory 16b.

Such time instant data which first appears among the data of the memory block M1 is stored in the memory block TI. In other words, a representative value of the time instant data group stored in the memory block M1 is stored in the memory block TI. In the above-described example, when the data up to the third time period has been processed, the time instant data ($t_1, t_2, t_3, t_4, t_5$) are stored into the memory block TI.

On the other hand, data for indicating appearing times of the respective time instant data is stored at the address corresponding to the memory block TI into the memory block N. In the above example, when the data up to the third time period has ended, such data (31211) is stored. At this time, three times of the time instant data $t_1$, correspond to the maximum value.

Figure 5B:
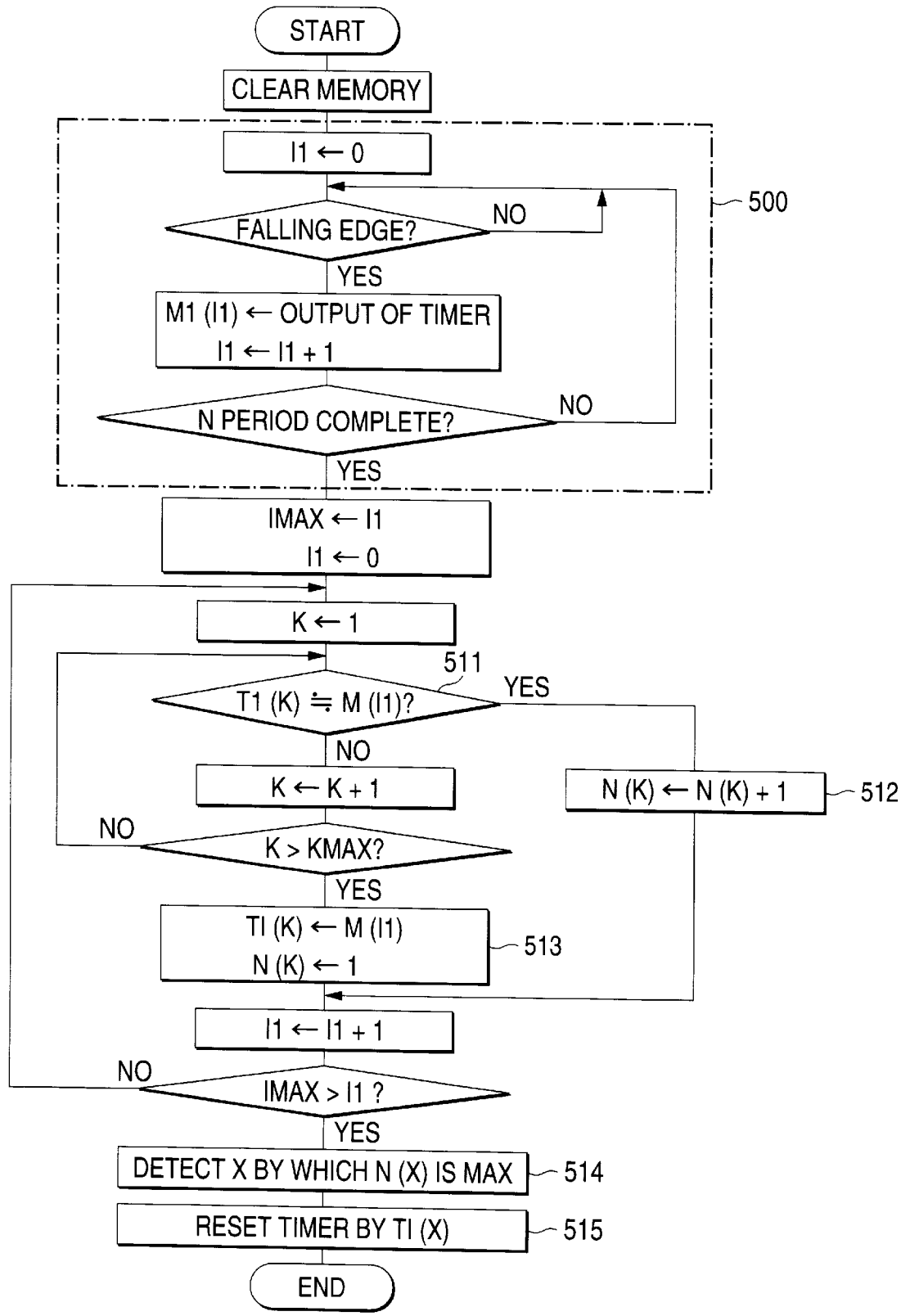

FIG. 5B is a flow chart for describing the above-explained second embodiment of the present invention as a concrete example. In this drawing, symbol "TI" represents time instant data which has been firstly read; symbol "K" denotes an address of the memory TI, symbol "N( )" shows appearing times of time instant data stored in the memory TI; symbol "TI" indicates an address of the memory M1; and symbol "$I_{MAX}$" represents a last address of the time instant data stored in the memory M1.

Third Embodiment

Figure 6:
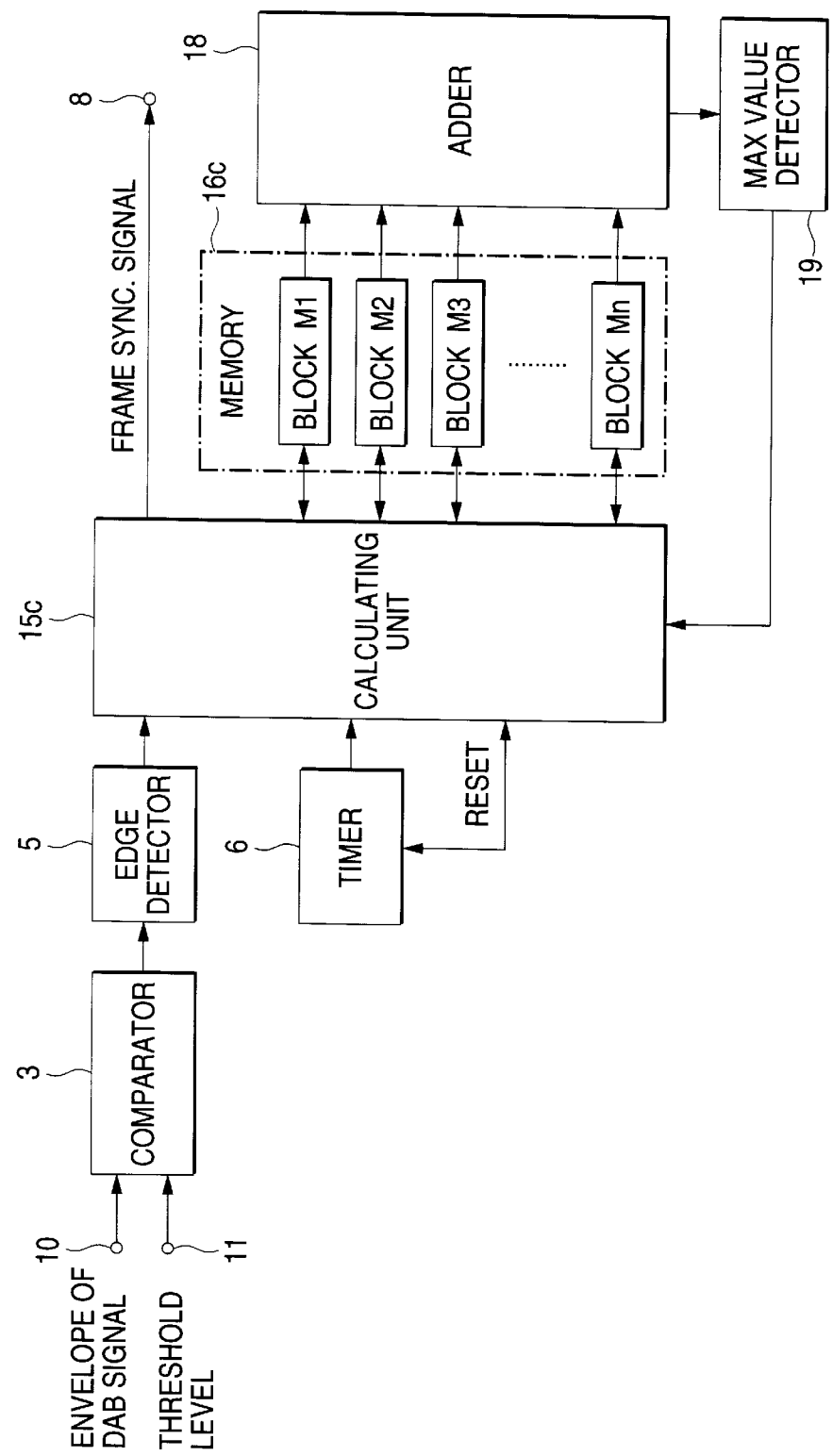
FIG. 6 is a block diagram for showing a synchronizing signal detecting apparatus according to third embodiment of the present invention.

FIG. 6 is a block diagram for indicating a synchronizing signal detection apparatus according to third embodiment of the present invention. It should be noted that the same reference numerals of FIG. 1 are employed as those for denoting the same or similar circuit elements in this embodiment. In this drawing, reference numeral 15c indicates a calculating unit for calculating a periodic characteristic of a synchronizing signal from the outputs of the edge detecting unit 5 and the timer 6. Reference numeral 16c denotes a memory connected to the calculating unit 15c. Symbols M1 to Mn represent memory blocks. Reference numeral 18 is an adder for adding data of addresses corresponding to the memory blocks M1 to Mn. Reference numeral 19 shows a maximum value detecting unit for detecting a maximum value of outputs from the adder 18.

Next, a description will now be made the operations of this circuit arrangement which are different from the first or second embodiment.

The edge detecting unit 5 detects the falling edge of the input envelope output signal, and uses this detected edge as head timing of a frame of this DAB signal.

The falling edge detected by edge detecting unit 5 may be mixed with falling timing signals irrelevant to the head of the DAB signal.

Figure 7A:
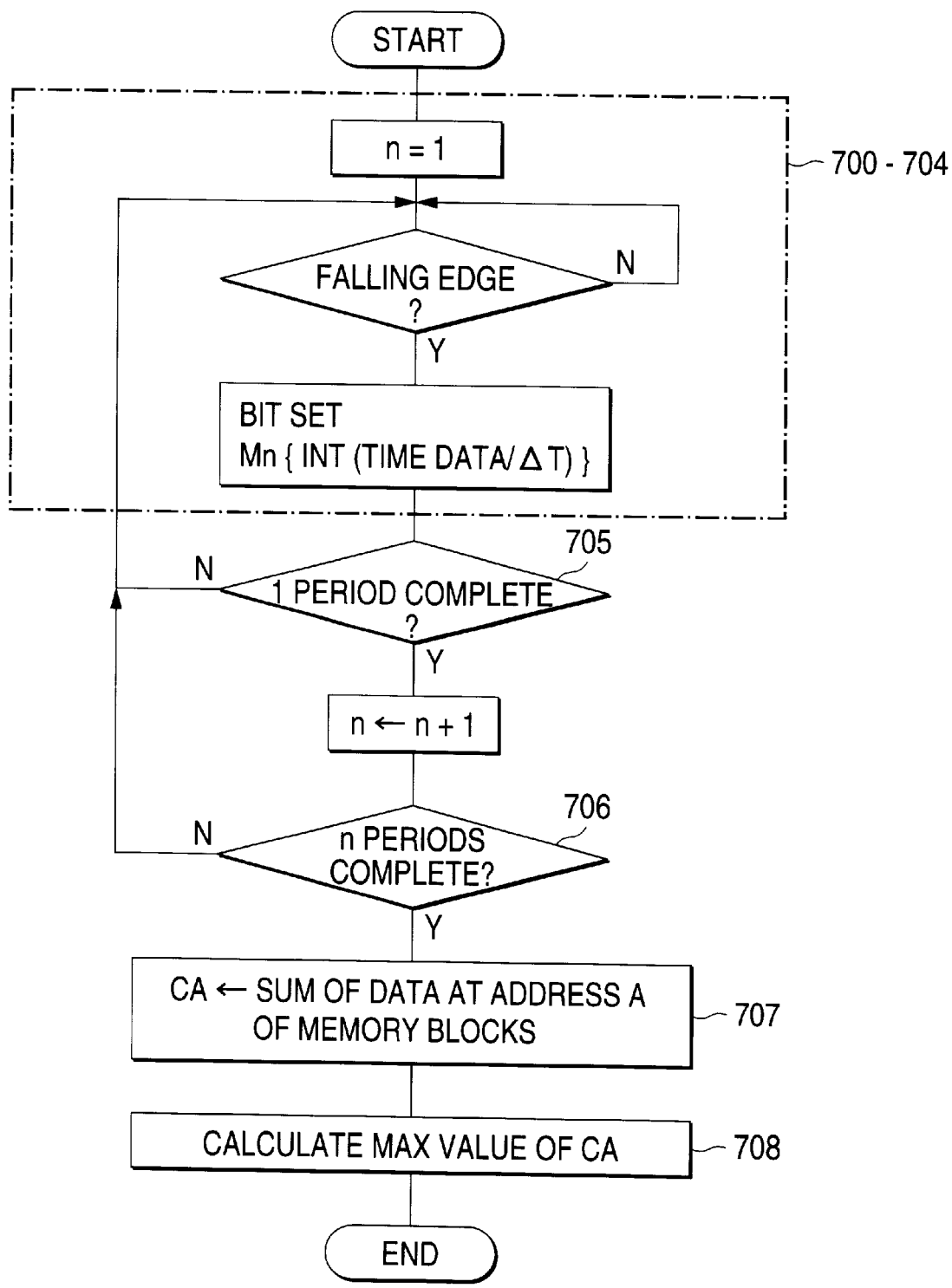
FIGS. 7A and 7B are flow charts of the third embodiment.
Figure 7B:
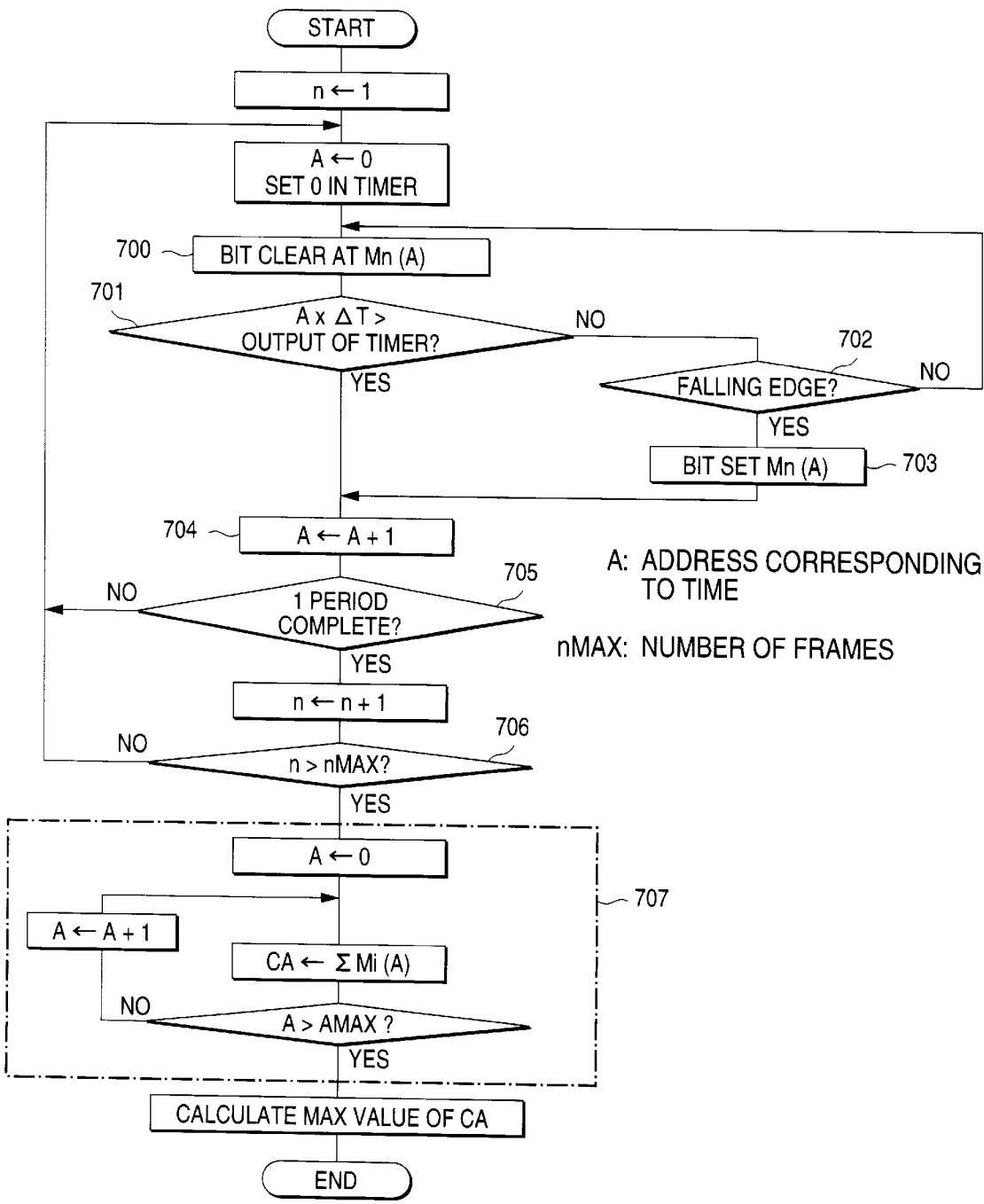

The calculating unit 15c detects timing of a synchronizing signal in accordance with flow charts shown in FIGS. 7A and 7B.

First, the time instant data output from the timer 6, and the timing signal of the falling edge detected by the edge detecting unit 5 are inputted into the calculating unit 15c.

In this embodiment, an original time period of a frame of a DAB signal is assumed as "T".

The process operation is carried out every 1 time period.

In this case, assuming now that a necessary time resolution performance is $\Delta T'$, such a $\Delta T$ is set which satisfies $\Delta T \leq \Delta T'$ and time period T=integer×$\Delta T$.

For a first time period, a time period of $\Delta T$ is monitored at a step 701. If the falling edge is detected during this time period at a step 702, then "1" is written at a corresponding address of the block M1 of the memory 16c at a step 703. To the contrary, if the falling edge cannot be detected, then "0" is written at a step 700. During the next time period of $\Delta T$, the address of the block M1 is incremented by 1 at a step 704, and the same process operation as the above-described process operation is carried out. Since the process operation is performed in this manner, the time corresponds to the address of the block M1. This process operation is repeated until the output value of the timer 6 becomes T. When the time instant data of the timer 6 becomes T, the timer 6 is reset so as to set the time instant to 0.

A process operation for a second time period is carried out by executing the above-explained process operation performed in the first time period with respect to the block M2 of the memory 16c. In other words, this process operation is performed until the set time period "n" at a step 706. At a step 707, data of addresses corresponding to the same time instants of the memory blocks M1 to Mn are added by the adder 18, and the added data are entered into the maximum value detecting unit 19 at a step 707. The maximum value detecting unit 19 detects a maximum value from the added results corresponding to the time instants, and then supplies the maximum value to the calculating unit 15c.

The calculating unit 15c judges that a time instant corresponding to an address of this maximum value is time in which the time of the timer 6 is shifted from the head timing of the frame. Then, the calculating unit 15c shifts the time of the timer 6 only by this maximum value in order that when the time instant of the timer 6 become 0, timing of a head of a frame of a DAB signal can be obtained. Subsequently, when the time instant of the timer 6 becomes T, the calculating unit 15c again sets the time instant of the timer 6 to 0, and sets the level of the output terminal 8 to an L level during a preselected time period, and thereafter brings the L level to an H level.

It should be understood that 1 bit data may be written into the blocks 1 to Mn of the memory 16c with respect to one address.

Fourth Embodiment

FIG. 8 is a block diagram for indicating a synchronizing signal detection apparatus according to fourth embodiment of the present invention. It should be noted that the same reference numerals of FIG. 1 are employed as those for denoting the same or similar circuit elements in this embodiment. In this drawing, reference numeral 15d indicates a calculating unit for calculating a periodic characteristic of a synchronizing signal from the outputs of the edge detecting unit 5 and the timer 6. Reference numeral 16d denotes a memory connected to the calculation unit 15d. Symbols M1 to Mn represent memory blocks. Reference numeral 20 shows a continuous time counting unit for counting times at which the data "1" of the addresses corresponding to the memory blocks M1 to Mn are continued. Reference numeral 21 is a maximum value detecting unit for calculating a maximum value of outputs from the continuous time counting unit 20.

Next, a description will now be made the operations of this circuit arrangement which are different from the above-described embodiments.

The edge detecting unit 5 detects the falling edge and uses this detected edge as head timing of a frame of this DAB signal.

The falling edge detected by edge detecting unit 5 may be mixed with falling timing signals irrelevant to the head of the DAB signal.

Figure 9A:
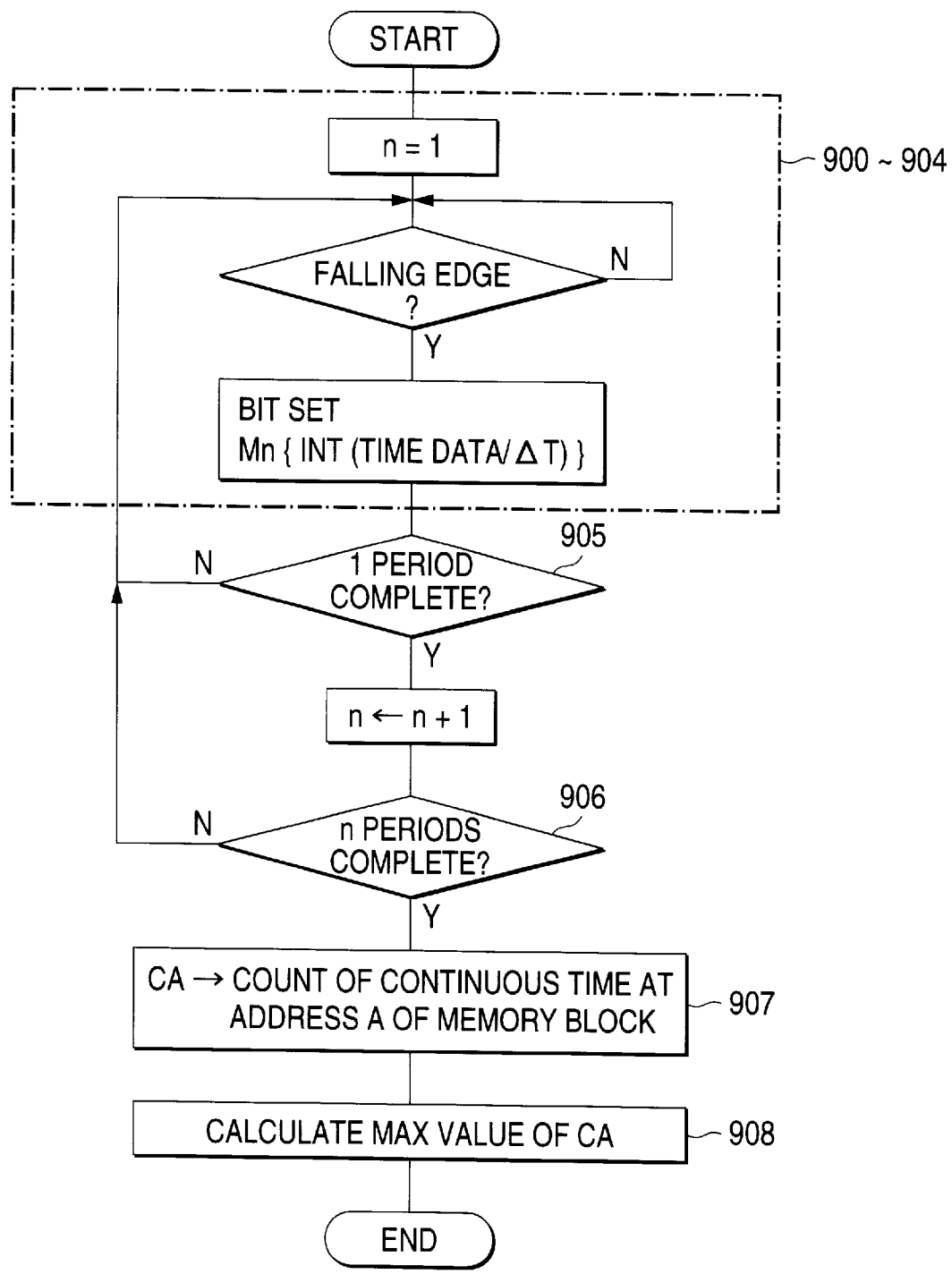
FIGS. 9A and 9B are flow charts of the fourth embodiment.
Figure 9B:
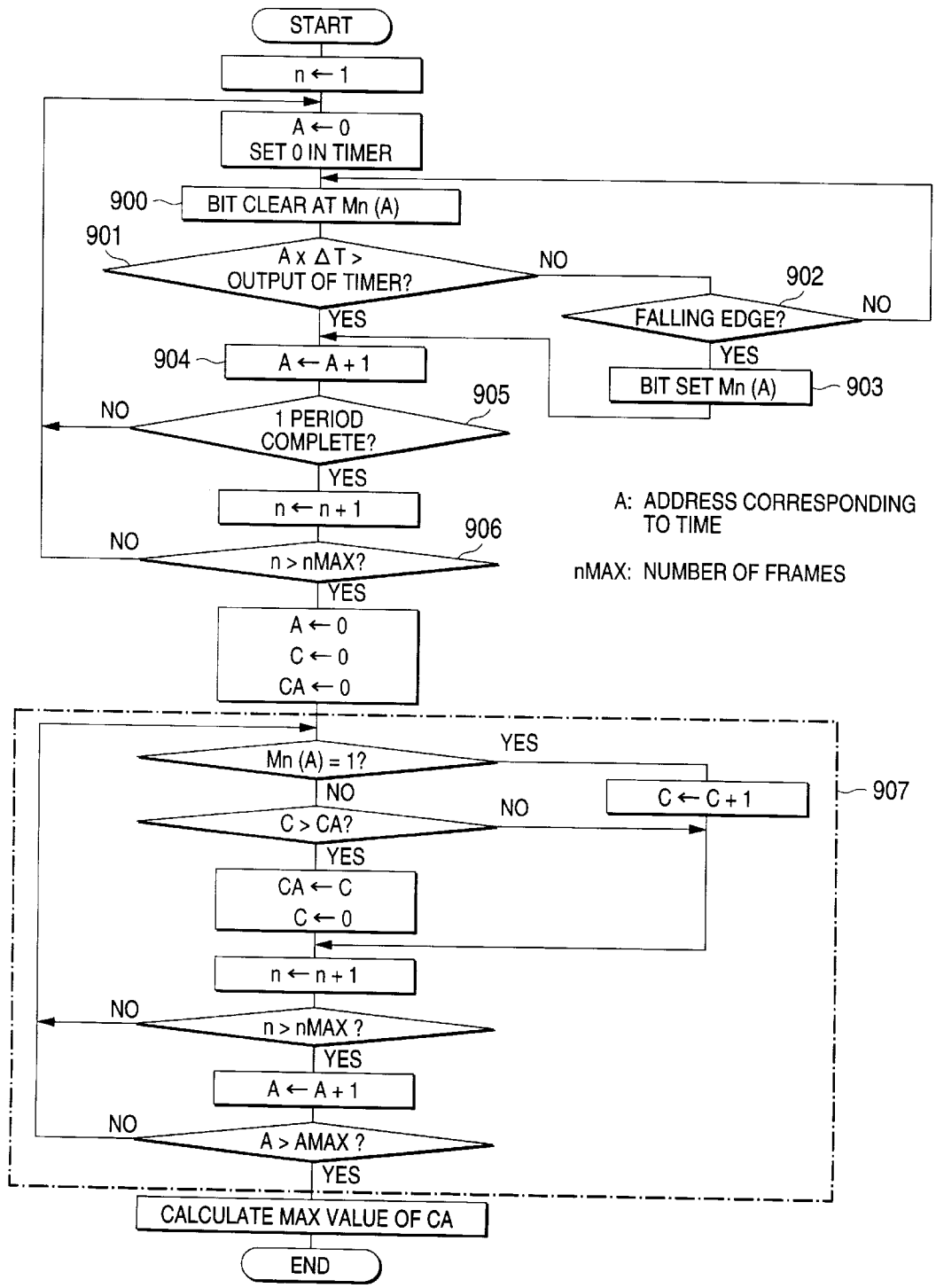
Figure 10:
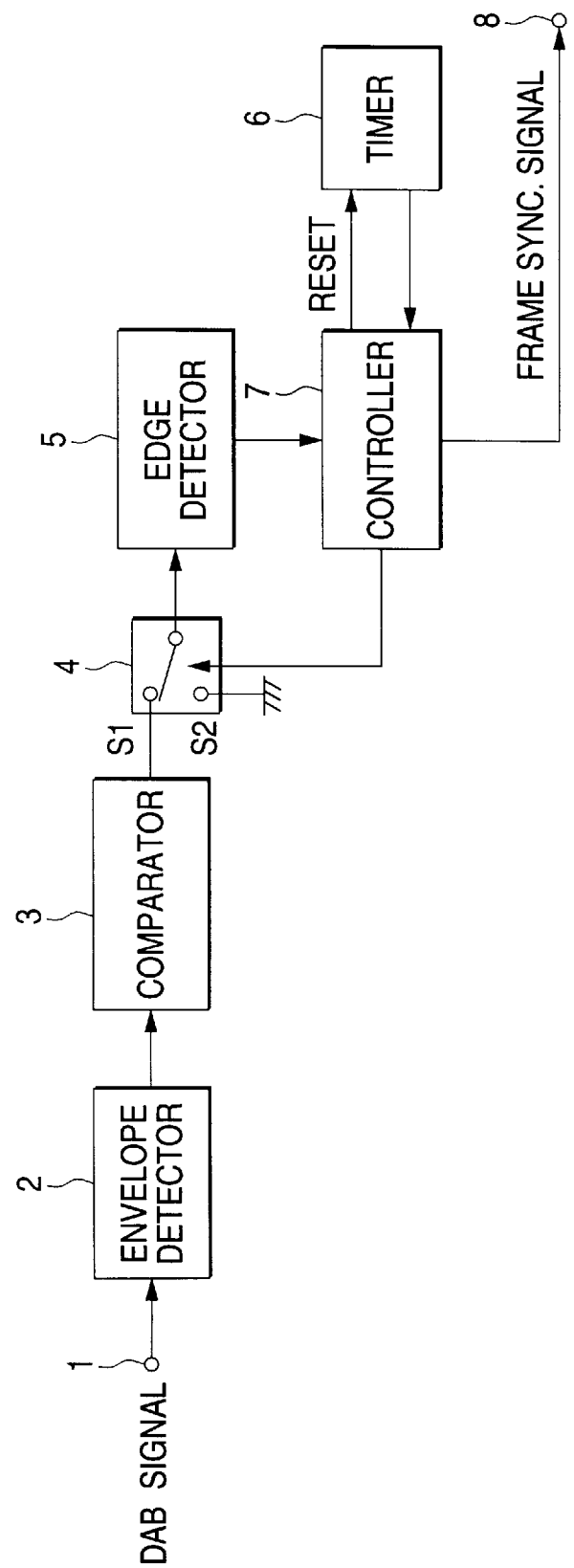
FIG. 10 is a block diagram of the conventional synchronizing signal detecting apparatus.

The calculating unit 15b detects timing of a head of a frame of a DAB signal in accordance with a flow chart shown in FIG. 9.

First, the time instant data outputted from the timer 6, and the timing signal of the falling edge detected by the edge detecting unit 5 are input into the calculating unit 15d.

In this embodiment, an original time period of a frame of a DAB signal is assumed as "T".

The process operation is carried out every 1 time period.

In this case, assuming now that a necessary time resolution performance is $\Delta T'$, such a $\Delta T$ is set which satisfies $\Delta T \leq \Delta T'$ and time period T of a frame=integer×$\Delta T$.

For a first time period, a time period of $\Delta T$ is monitored at a step 901. If the falling edge is detected during this time period $\Delta T$ at a step 902, then "1" is written at a corresponding address of the block M1 of the memory 16d at a step 903. To the contrary, if the falling edge cannot be detected, then "0" is written at a step 900. During the next time period of $\Delta T$, the address of the block M1 is incremented by 1 at a step 904, and the same process operation as the above-described process operation is carried out. Since the process operation is performed in this manner, the time corresponds to the address of the block M1. This process operation is repeated until the output value of the timer 6 becomes T.

When the time instant data of the timer 6 becomes T, the timer 6 is reset so as to set the time instant to 0. A process operation for a second time period is carried out by executing the above-explained process operation performed in the first time period with respect to the block M2 of the memory 16d.

This process operation is carried out until a time period "n" set at a step 906. At a step 907, the continuous time counting unit 20 counts the times at which the data of the addresses corresponding to the same time instants of the blocks M1 to the block Mn of the memory 16d are continued with "1". The counted result is entered into the maximum value detecting unit 21. The maximum value detecting unit 21 detects a maximum value among the continuous times every time instant detected by the continuous time counting unit 20. This detected maximum value is entered into the calculating unit 15d.

The calculating unit 15d judges that a time instant corresponding to an address of this maximum value is such time at which the time of the timer 6 is shifted from the head timing of the frame of the DAB signal, and then shifts the time of the timer 6 only by this maximum value, so that when the time instant of the timer 6 becomes 0, the synchronized timing is obtained.

Subsequently, when the output of the timer 6 becomes T, the calculating unit 15a again sets the timer 6 to 0, and brings the level of the output terminal 8 to an L level for a preselected time period, and thereafter brings this L level to an H level.

It should be understood that 1 bit data may be written into the blocks 1 to Mn of the memory 16d with respect to a single address.

In the above-described embodiment, the falling edge of the signal indicative of the frame period of the DAB signal is detected so as to detect the frame period. Alternatively, as apparent from the foregoing descriptions, there is a similar effect when the present invention is applied not only to the DAB signal detection, but also a detection of synchronization timing of a signal with a synchronizing characteristic.

Since the present invention has been arranged as described above, there are the following effects.

Since the time instant data when the timing of the synchronizing signal is detected is stored in the recording medium and the timing having the continuous periodic characteristic is detected by employing the time instant data of this recording medium, there is an effect to provide such a synchronizing signal detecting apparatus capable of detecting the timing within short time even when there is the mixed timing signal.

Also, since the time instant data when the timing of the synchronizing signal is stored in the recording medium, and such timing that there are the largest numbers of time instant data having the time periods integer times higher than the time period of the frame of the synchronizing signal is detected by employing the time instant data of this recording medium, even in such a case that the mixed timing signal is present and the timing signal is dropped out, there is another effect to obtain the synchronizing signal detecting apparatus capable of detecting the timing within short time by executing a simple process operation.

While the address of the recording medium is made in correspondence with the timing detected time instant of the synchronizing signal, the data "1" is stored at the address of the recording medium corresponding to this detected time instant every time the timing is detected, and a detection is made of such an address that the added value of the data "1" of the address for the time instance becomes a maximum value from the data of this storage medium, which corresponds to a time period obtained by multiplying the original time period by approximately an integer valve. Then, the timing is detected from the time instant corresponding to this address. Accordingly, even in such a case that the mixed timing signal is present and the timing signal is dropped out, there is another effect to obtain the synchronizing signal detecting apparatus capable of detecting the timing within a short time by executing a simple process operation.

While the address of the recording medium is made in correspondence with the timing detected time instant of the synchronizing signal, the data "1" is stored at the address of the recording medium corresponding to this detected time instant every time the timing is detected, and a detection is made of such an address that there are the largest numbers where the data "1" of the addresses of the time instants are continued from the data of this storage medium, which correspond to a time instant obtained by multiplying the original time period by an approximately integer. Then, the timing is detected from the time instant corresponding to this address. As a consequence, even in such a case that the mixed timing signal is present and the timing signal is dropped out, there is another effect to obtain the synchronizing signal detecting apparatus capable of detecting the timing within short time by executing a simple process operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronizing signal detecting apparatus comprising:

a timer for outputting time instant data;

detecting means for detecting a time instant value for each of a plurality of potential synchronizing signals occurring during a time frame series;

means for determining a count value for time instant values which are detected for consecutive time frames;

first storage means for storing a detected time instant value for each of the plurality of potential synchronizing signals;

second storage means for storing each time instant value having a count value equal to a preselected amount;

time data coincident detecting means in which only one time instant value having the largest count value is detected from time instant values stored in said second storage means, and when one such time instant value cannot be detected, the detecting operation performed by said detecting means is sequentially repeated for subsequent time frames series; and means for outputting a synchronizing signal when said time data coincident detecting means detects one time instant value having the largest count value.

2. A synchronizing signal detecting apparatus comprising:

a timer for outputting time instant data;

means for detecting a time instant value for each of a plurality of potential synchronizing signals;

means for forming a plurality of groups of detected time instant values which are related by a predetermined time offset, and counting a quantity of time instant values in each group;

first storage means for storing detected time instant values;

second storage means for storing a count quantity for each of the groups formed by said grouping means;

maximum value detecting means for detecting a maximum value of the count quantities stored in said second storage means; and means for outputting a synchronizing signal based on the maximum value detected by said maximum value detecting means.

3. A synchronizing signal detecting apparatus comprising:

a timer for outputting time instant data;

detecting means for detecting a time instant value for each of a plurality of potential synchronizing signals and for outputting a first data value when a potential synchronizing signal is detected;

address detecting means for associating each time instant value with an address;

a plurality of storage means, each corresponding to a predetermined time period, for storing the first data value at an address associated by said address detecting means when the potential synchronizing signal occurred during the corresponding time period;

an adder for adding the number of first data values stored at the same address in said plurality of storage means;

maximum value detecting means for detecting a maximum value of the added data values from said adder; and means for correcting a synchronizing signal timing based on the maximum value detected by said maximum value detecting means.

4. A synchronizing signal detecting apparatus comprising:

a timer for outputting time instant data;

detecting means for detecting a time value for each of a plurality of potential synchronizing signals and for outputting a first data value each time a potential synchronizing signal is detected;

address detecting means for associating each time instant value with an address;

a plurality of storage means, each corresponding to a predetermined time period, storing the first data value at an address associated by said address detecting means when the potential synchronizing signal occurs during the corresponding time period;

continuous time counting means for detecting the number of consecutive times the first data value is stored at the respective addresses of said plurality of storage means;

a maximum value detector for detecting a maximum value counted by said continuous time counting means; and means for correcting a synchronizing signal timing based on the maximum value detected by said maximum value detector.

5. A synchronizing signal detecting apparatus comprising:

detecting means for detecting potential synchronizing signals occurring during a first time frame to generate a first set of potential synchronizing signals, and detecting potential synchronizing signals occurring during a second time frame to generate a second set of potential synchronizing signals;

generating means for generating a refined set of potential synchronizing signals corresponding to potential synchronizing signals which occur in both the first set and the second set; and deciding means for deciding when the refined set of potential synchronizing signals includes a single potential synchronizing signal that a synchronizing signal has been detected, and deciding when the refined set of potential synchronizing signals has more than one potential synchronizing signal that further processing is required.

6. The apparatus of claim 5, wherein the plurality of potential synchronizing signals detected by said detection means are represented by time instant values.

7. The apparatus of claim 5, wherein, when said deciding means decides that a synchronizing signal has been detected, said deciding means confirms the detected synchronizing signal by determining whether a synchronizing signal occurs at a subsequent time interval.

8. The apparatus of claim 5, wherein, when said deciding means decides that further processing is required, said detecting means detects potential synchronizing signals occurring during a third time frame to generate a third set of potential synchronizing signals, and said generating means generates another refined set of potential synchronizing signals corresponding to potential synchronizing signals which occur in both the second and third sets.

9. A synchronizing signal detecting apparatus comprising:

detecting means for detecting, during a plurality of time frames 1 to N, potential synchronizing signals;

monitoring means for monitoring potential synchronizing signals which occur during a plurality of the time frames 1 to N, and generating a count value for each of the monitored potential synchronizing signals based on the number of time frames the potential synchronizing signal occurs in; and deciding means for deciding, based on the count values generated by said monitoring means, a synchronizing signal.

10. The apparatus of claim 9, wherein the plurality of potential synchronizing signals detected by said detection means are represented by time instant values.

11. The apparatus of claim 9, wherein each time frame 1 to N is divided into time increments 1 to P, and wherein said monitoring means comprises:

a memory having a plurality of memory blocks 1 to N respectively corresponding to time frames 1 to N, each memory block being divided into a plurality of memory cells 1 to P respectively corresponding to time increments 1 to P, wherein each memory cell 1 to P stores a first value when a potential synchronizing signal occurs at the corresponding time segment, and stores a second value when and no potential synchronizing signal occurs at the corresponding time segment; and calculating means for totaling the number first values stored for each memory cell location 1 to P of memory blocks 1 to N to determine the time increment at which potential synchronizing signals most commonly occur.

12. A synchronizing signal detecting apparatus comprising:

detecting means for detecting, during each of a plurality of time frames 1 to N, potential synchronizing signals;

monitoring means for monitoring potential synchronizing signals which occur during a number of successive time frames 1 to N, and generating a count value for each of the monitored potential synchronizing signals based on the number of successive time frames the monitored potential synchronizing time signal occurs in; and deciding means for deciding, based on the count values generated by said monitoring means, a synchronizing signal.

13. The apparatus of claim 12, wherein the potential synchronizing signals detected by said detection means are represented by time instant values.

14. The apparatus of claim 12, wherein each time frame 1 to N is divided into time increments 1 to P, and wherein said monitoring means comprises:

a memory having a plurality of memory blocks 1 to N respectively corresponding to time frames 1 to N, each memory block being divided into a plurality of memory cells 1 to P respectively corresponding to time increments 1 to P, wherein each memory cell 1 to P stores a first value when a potential synchronizing signal occurs at the corresponding time segment, and stores a second value when and no potential synchronizing signal occurs at the corresponding time segment; and calculating means for totaling the number consecutive first values stored for each memory cell location 1 to P of memory blocks 1 to N to determine the time increment at which potential synchronizing signals have the highest number of consecutive occurrences.

15. A method of detecting a synchronizing signal comprising:

detecting potential synchronizing signals occurring during a first time frame to generate a first set of potential synchronizing signals, and detecting potential synchronizing signals occurring during a second time frame to generate a second set of potential synchronizing signals;

generating a refined set of potential synchronizing signals corresponding to potential synchronizing signals which occur in both the first set and the second set; and deciding when the refined set of potential synchronizing signals includes a single potential synchronizing signal that a synchronizing signal has been detected, and deciding when the refined set of potential synchronizing signals has more than one potential synchronizing signal that further processing is required.

16. The method of claim 15, wherein the plurality of detected potential synchronizing signals are represented by time instant values.

17. The method of claim 15, wherein, when said deciding step decides that a synchronizing signal has been detected, said deciding step confirms the detected synchronizing signal by determining whether a synchronizing signal occurs after a subsequent time interval.

18. The method of claim 15, wherein, when said deciding step decides that further processing is required, said detecting step detects potential synchronizing signals occurring during a third time frame to generate a third set of potential synchronizing signals, and said generating step generates another refined set of potential synchronizing signals corresponding to potential synchronizing signals which occur in both the second and third sets.

19. A method of detecting a synchronizing signal comprising:

detecting, during a plurality of time frames 1 to N, potential synchronizing signals;

monitoring potential synchronizing signals which occur during a plurality of the time frames 1 to N, and generating a count value for each of the monitored potential synchronizing signals based on the number of time frames the monitored potential synchronizing signal occurs in; and deciding, based on the count values generated by said monitoring means, a synchronizing signal.

20. A method of detecting a synchronizing signal comprising:

detecting, during each of a plurality of time frames 1 to N, potential synchronizing signals;

monitoring potential synchronizing signals which occur during a number of successive time frames 1 to N, and generating a count value for each of the monitored potential synchronizing signals based on the number of successive time frames during which the monitored potential synchronizing signals occurs in; and deciding, based on the count values generated by said monitoring step, a synchronizing signal.

* * * * *